United States Patent
Choi et al.

(10) Patent No.: US 12,009,681 B2
(45) Date of Patent: Jun. 11, 2024

(54) SYSTEM COMPRISING ELECTRONIC DEVICE AND BATTERY CHARGING DEVICE, AND OPERATION METHOD THEREFOR

(71) Applicant: Samsung Electronics Co., Ltd., Gyeonggi-do (KR)

(72) Inventors: Heeseung Choi, Gyeonggi-do (KR); Sungwoo Choi, Gyeonggi-do (KR); Yongsuk Lee, Gyeonggi-do (KR); Youngwoo Cho, Gyeonggi-do (KR); Woojong Cho, Gyeonggi-do (KR); Kuyoung Choi, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 410 days.

(21) Appl. No.: 17/421,419

(22) PCT Filed: Jan. 21, 2020

(86) PCT No.: PCT/KR2020/001044
§ 371 (c)(1),
(2) Date: Jul. 8, 2021

(87) PCT Pub. No.: WO2020/153727
PCT Pub. Date: Jul. 30, 2020

(65) Prior Publication Data
US 2022/0158466 A1    May 19, 2022

(30) Foreign Application Priority Data

Jan. 21, 2019   (KR) .................. 10-2019-0007560

(51) Int. Cl.
*H02J 7/00*       (2006.01)
*B25J 19/00*     (2006.01)

(52) U.S. Cl.
CPC .......... *H02J 7/0045* (2013.01); *B25J 19/005* (2013.01); *H02J 2310/22* (2020.01)

(58) Field of Classification Search
CPC ...... H02J 7/0045; H02J 2310/22; B60L 53/80
(Continued)

(56) References Cited

U.S. PATENT DOCUMENTS

| 2002/0138657 A1 | 9/2002 | Hirofuji |
| 2010/0088843 A1* | 4/2010 | Reed ..................... A47L 9/2873 320/112 |

(Continued)

FOREIGN PATENT DOCUMENTS

| CN | 206059566 | * | 3/2017 |
| CN | 206059566 U |  | 3/2017 |

(Continued)

OTHER PUBLICATIONS

KR100619743 Machine Translation, 6 pages (Year: 2006).*
Korean Office Action dated Oct. 4, 2023.

*Primary Examiner* — Nathaniel R Pelton
(74) *Attorney, Agent, or Firm* — Cha & Reiter, LLC

(57) ABSTRACT

An electronic device, according to one embodiment of the present invention, comprises: a housing; a drive unit for moving the housing; a battery mounting unit formed in the housing so as to enable the placement of batteries, the battery mounting unit comprising a first slot enabling the placement of a first battery, and a second slot enabling the placement of a second battery; a separator device, disposed on the battery mounting unit, for separating the first battery from the first slot or separating the second battery from the second slot; and a processor electrically connected to the drive unit and the separator device, wherein the processor may control the separator device so that same separates the second battery from the second slot when the first battery is placed in the first slot, and separates the first battery from the (Continued)

first slot when the second battery is placed in the second slot. In addition, other various embodiments are possible.

19 Claims, 32 Drawing Sheets

(58) Field of Classification Search
USPC .......................................................... 320/107
See application file for complete search history.

(56) References Cited

U.S. PATENT DOCUMENTS

| | | |
|---|---|---|
| 2013/0009592 A1 | 1/2013 | Larsen et al. |
| 2018/0312069 A1* | 11/2018 | McClymond ........... B60L 53/51 |

FOREIGN PATENT DOCUMENTS

| | | | |
|---|---|---|---|
| KR | 1998-041424 U | | 9/1998 |
| KR | 20-0276118 | | 5/2002 |
| KR | 10-2005-0055516 A | | 6/2005 |
| KR | 10-0492538 B1 | | 6/2005 |
| KR | 10-0619743 | * | 9/2006 |
| KR | 10-0619743 B1 | | 9/2006 |
| KR | 10-2010-0013362 A | | 2/2010 |
| KR | 10-1233210 B1 | | 2/2013 |
| WO | 2018/215579 A1 | | 11/2018 |

* cited by examiner

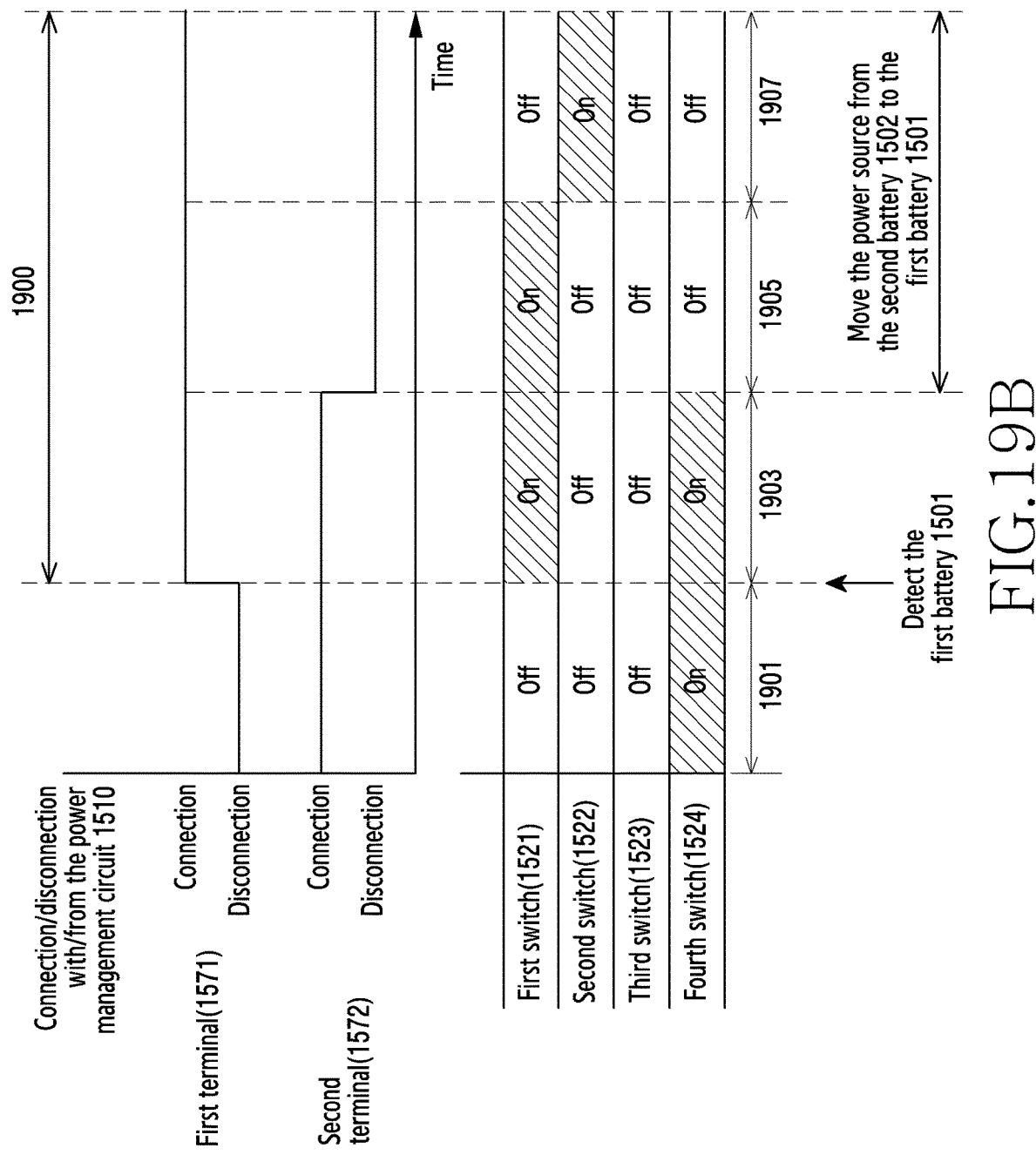

SYSTEM COMPRISING ELECTRONIC DEVICE AND BATTERY CHARGING DEVICE, AND OPERATION METHOD THEREFOR

CROSS REFERENCE TO RELATED APPLICATIONS

This application is a National Phase Entry of PCT International Application No. PCT/KR2020/001044/, which was filed on Jan. 21, 2020, and claims a priority to Korean Patent Application No. 10-2019-0007560, which was filed on Jan. 21, 2019, the contents of which are incorporated herein by reference.

TECHNICAL FIELD

Various embodiments of the disclosure relate to a system including an electronic device and a battery charging device, and an operation method therefor.

BACKGROUND ART

An electronic device may travel itself in a work area of a predetermined range without user involvement. For example, a mobile electronic device may travel along a work area through a sensor or a camera, and may perform a work according to various user control commands in a work environment. When the electronic device needs to be charged, it may move to a charging device and may charge a battery.

DISCLOSURE OF INVENTION

Technical Problem

An electronic device may stop a work that it has performed while charging a battery through a charging device, which makes it difficult to guarantee continuity of the work.

Various embodiments of the disclosure may provide a system including an electronic device and a battery charging device, which can replace a battery while guaranteeing continuity of a work, and an operation method therefor.

The technical objects to be achieved by the disclosure are not limited to that mentioned above, and other technical objects that are not mentioned above may be clearly understood to those skilled in the art based on the description provided below.

Solution to Problem

According to an embodiment of the disclosure, an electronic device includes: a housing; a driving unit configured to move the housing; a battery mounting portion formed in the housing to have a battery disposed therein, the battery mounting portion including a first slot to have a first battery disposed therein and a second slot to have a second battery disposed therein; a separation device disposed in the battery mounting portion to separate the first battery from the first slot or to separate the second battery from the second slot; a processor electrically connected with the driving unit and the separation device; and a memory operatively connected with the processor, wherein the memory is configured to store instructions that, when being executed, cause the processor to control the separation device to separate the second battery from the second slot when the first battery is disposed in the first slot, and to separate the first battery from the first slot when the second battery is disposed in the second slot.

According to an embodiment of the disclosure, an electronic device includes: a housing; a battery mounting portion formed in the housing to have a battery disposed therein, the battery mounting portion including a first slot to have a first battery disposed therein and a second slot to have a second battery disposed therein; a separation device disposed in the battery mounting portion to separate the first battery from the first slot or to separate the second battery from the second slot; a charging circuit configured to charge the first battery disposed in the first slot or the second battery disposed in the second slot by using an external power source; a processor electrically connected with the separation device and the charging circuit; and a memory operatively connected with the processor, wherein the memory is configured to store instructions that, when being executed, cause the processor to control the separation device to separate the second battery from the second slot when the first battery is disposed in the first slot, and to separate the first battery from the first slot when the second battery is disposed in the second slot.

According to an embodiment, an operation method of an electronic device includes: moving to a second electronic device when a remaining capacity of a first battery is less than or equal to a threshold value; when it is detected that a second battery is electrically connected with the electronic device, changing a power source of the electronic device from the first battery to the second battery; and separating the first battery from the electronic device.

Advantageous Effects of Invention

According to an embodiment of the disclosure, one battery having a remaining capacity less than or equal to a threshold value is transferred to a battery charging device from an electronic device, and the other battery greater than the threshold value or fully charged is transferred to the electronic device from the battery charging device by interaction between the electronic device and the battery charging device for battery replacement. Accordingly, compared to a method of charging a battery with an electronic device staying in a charging device for a time required to charge, the method of the disclosure enables the electronic device to guarantee driving power more rapidly and to maintain a work that the electronic device has performed without interruption. Since the battery charging device charges the battery transferred from the electronic device, driving power of the electronic device can be rapidly guaranteed.

BRIEF DESCRIPTION OF DRAWINGS

FIG. 19B is a view illustrating a circuit state in relation to the operation flow of FIG. 18 according to an embodiment;

BEST MODE FOR CARRYING OUT THE INVENTION

Hereinafter, various embodiments of the disclosure will be described with reference to the accompanying drawings.

Figure 1:
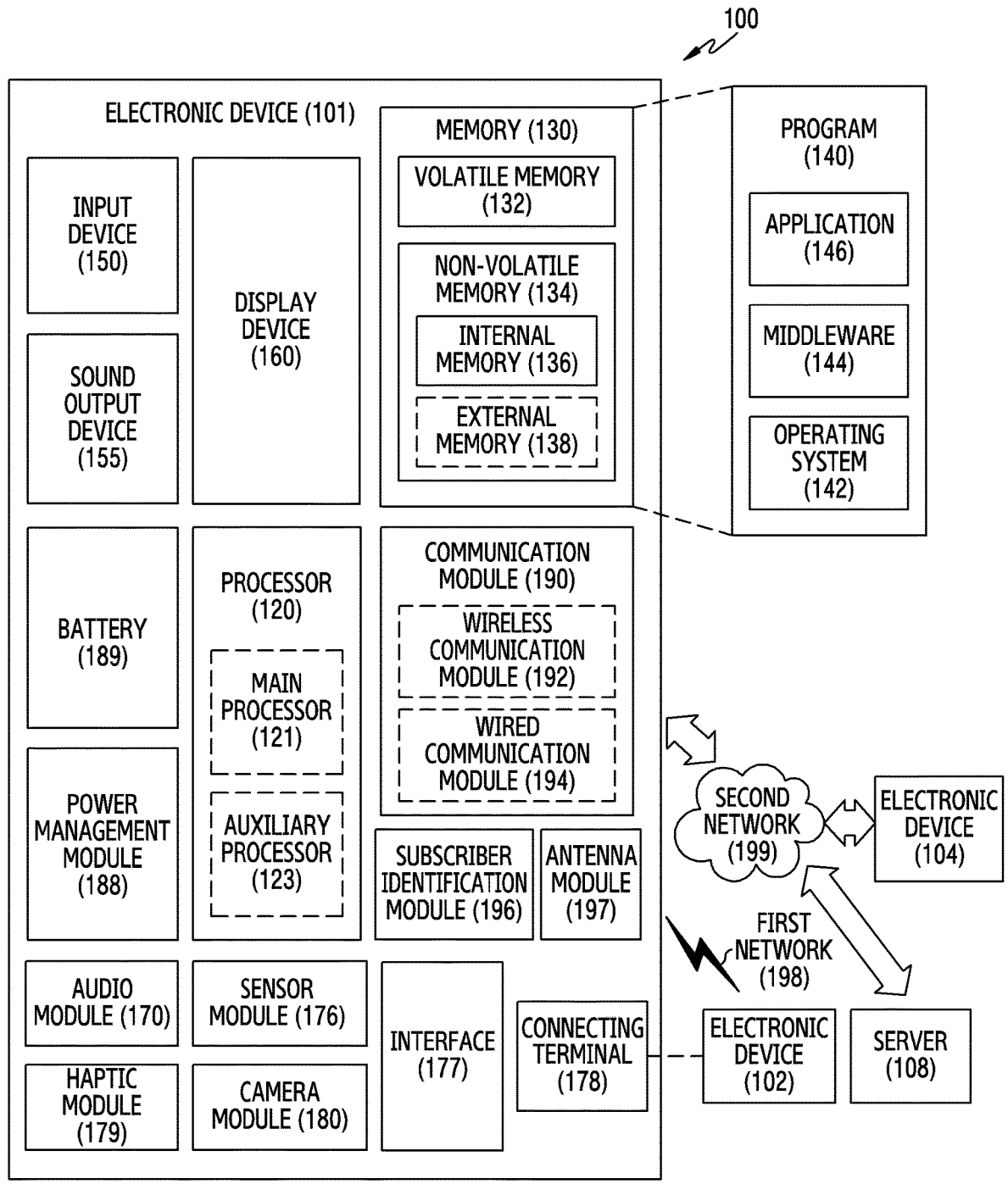
FIG. 1 is a block diagram of an electronic device in a network environment according to an embodiment.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used in a component (for example, the processor 120) of the electronic device 101 from an outside (for example, a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The electronic device 101 may further include a speech recognition module (not shown). For example, the speech recognition module may convert an acoustic speech signal obtained through a microphone included in the input device 150 or a sound sensor included in the sensor module 176 into a word or a sentence. The speech recognition module may perform an operation of extracting an acoustic signal and then removing a noise, and then, may recognize a speech by extracting characteristics of the speech signal and comparing with a speech model database (DB). According to an embodiment, the speech model DB may be stored and managed by an external electronic device (for example, the server 108), and the speech recognition module may access the external electronic device through the communication module 190.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from an outside (for example, an external electronic device). According to an embodiment, the antenna module may be formed with a conductor or a conductive pattern, and according to a certain embodiment, may further include other components (for example, a radio frequency integrated circuit (RFIC)) in addition to the conductor or the conductive pattern. According to an embodiment, the antenna module 197 may include one or more antennas, and from among these, at least one antenna suitable for a communication method used in a communication network such as the first network 198 or the second network 199 may be selected by the communication module 190, for example. A signal or power may be transmitted or received between the communication module 190 and an external electronic device through the at least one selected antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

According to an embodiment, the electronic device 101 may include a mobile robot. For example, the sensor module 176 (for example, a proximity sensor) may detect an external object. The camera module 180 (for example, a depth camera and/or an RGB camera) may continuously acquire vision information. The microphone may acquire speech information regarding driving of the mobile robot. The processor 120 may include at least one of an application processor (AP), a graphic processor, an image signal processor (ISP) or a codec digital signal processor (DSP) to process a command to drive the mobile robot and to provide a service. The memory 130 may include object data to be compared with detected object information. According to various embodiments, the memory 130 may store map information regarding automatic driving.

According to an embodiment, the electronic device 101 may include a driving unit as a mobile robot. For example, the driving unit may be used to move the mobile robot and to mechanically change other components. The driving unit may have a shape to be movable in the vertical direction and the horizontal direction or to be rotatable with reference to at least one shaft, and the shape may be implemented variously by combining a driving motor.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments disclosed in the disclosure may be included in a computer program product and may be provided. The computer program product may be traded between a seller and a purchaser as a product. The computer program product may be distributed in the form of a device-readable storage medium (for example, a compact disc read only memory (CD-ROM)), or may be distributed (for example, downloaded or uploaded) directly or online through an application store (for example, Play Store™) or between two user devices. In the case of online distribution, at least a portion of the computer program product may be at least temporarily stored in a device-readable storage medium, such as a memory of a server of a manufacturer, a server of an application store, or a server of a relay server, or may be temporarily generated.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2A:
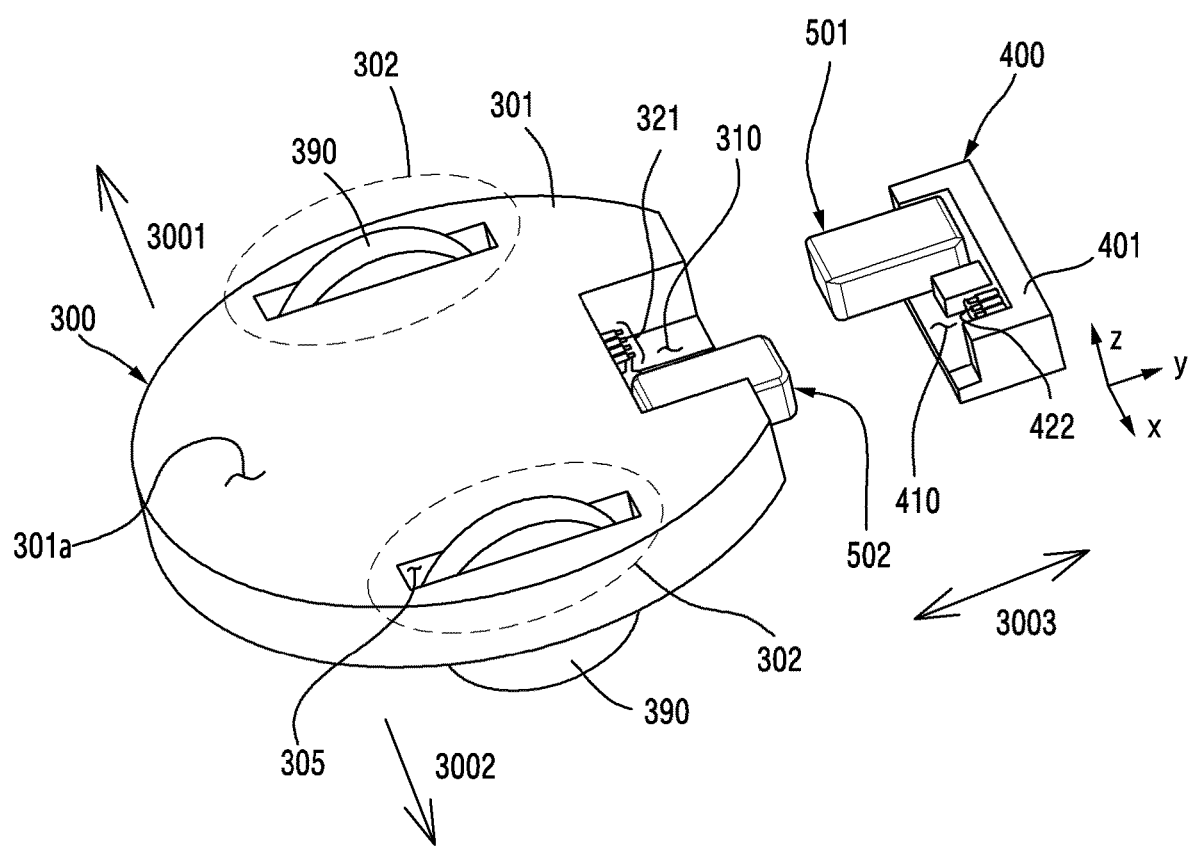
FIGS. 2A and 2B are perspective views of a system according to an embodiment.
Figure 2B:
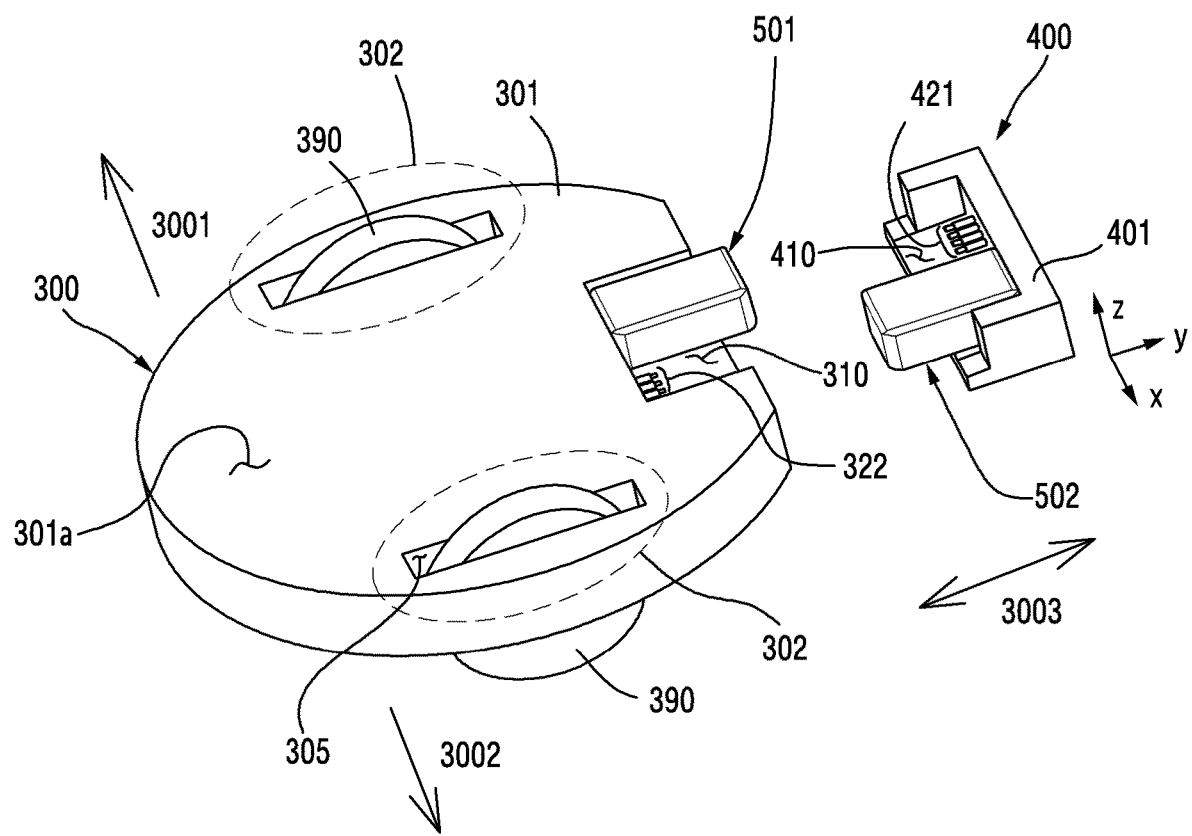
Figure 2C:
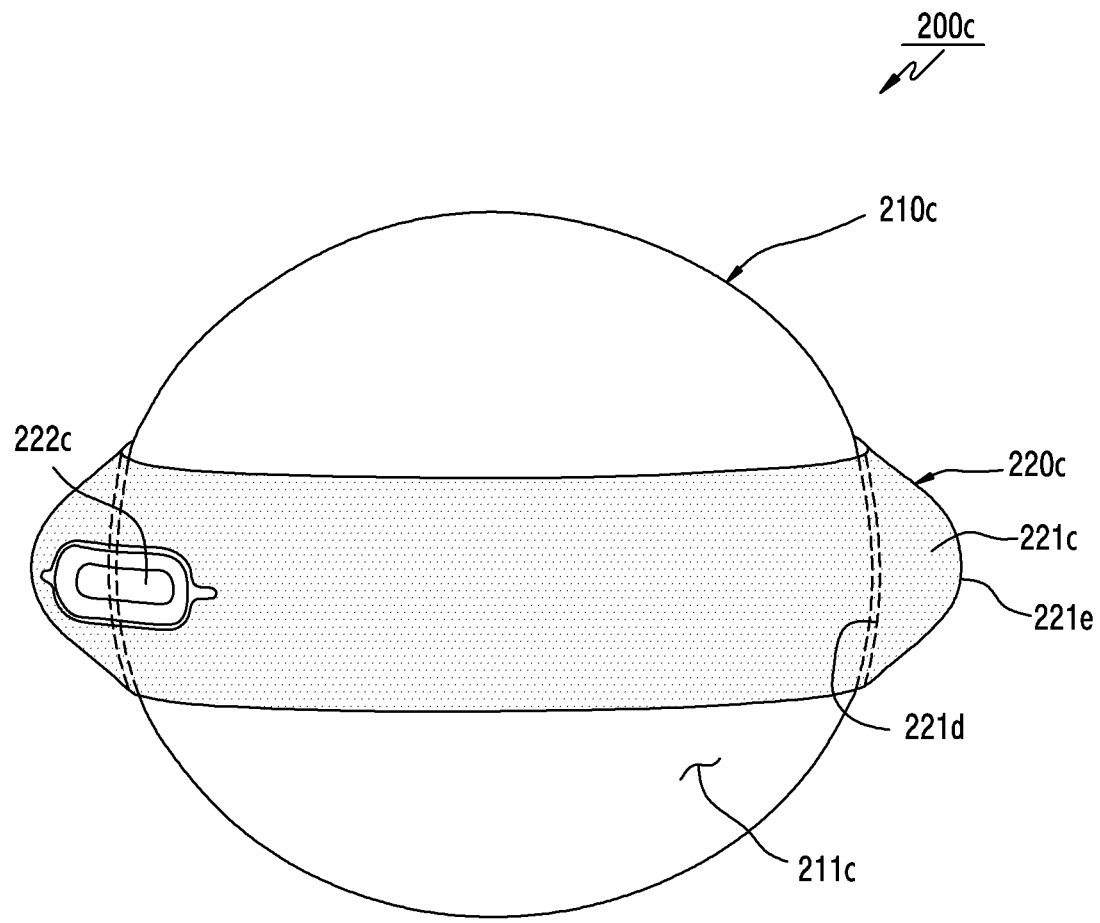
FIG. 2C is a perspective view of an electronic device according to various embodiments.

FIGS. 2A and 2B are perspective views of a system according to an embodiment. FIG. 2C is a perspective view of an electronic device according to various embodiments.

Referring to FIGS. 2A and 2B, the system 200 according to an embodiment may include an electronic device 300 (for example, the electronic device 101 of FIG. 1) and a docking station 400.

According to an embodiment, the electronic device 300 may include a mobile robot. For example, the electronic device 300 may detect an external object through a sensor module (for example, the sensor module 176 of FIG. 1) such as a proximity sensor. For example, the electronic device 300 may continuously acquire vision information through a camera module (for example, the camera module 180 of FIG. 1) such as a depth camera or an RGB camera. For example, the electronic device 300 may acquire speech information regarding driving through a microphone. A memory (for example, the memory 130 of FIG. 1) included in the electronic device 300 may include object data to be compared with detected object information. According to various embodiments, the memory may store map information regarding automatic driving.

According to an embodiment, the electronic device 300 may be a robot cleaner. In another example, the electronic device 300 may be a sensing robot for sensing a variety of information within a moving environment. The variety of information may include weather information including temperature, humidity, information regarding an object or a person positioned within a traveling environment. In an additional example, the electronic device 300 may be a mobile robot that performs various works according to a user command. In addition, various other embodiments are possible.

According to an embodiment, the electronic device 300 may include a first housing 301 and a driving unit (or a driving device) 302 for moving the electronic device 300. The first housing 301 may form an exterior of the electronic device 300 and may provide an inner space to have various electronic components such as a printed circuit board disposed therein. The driving unit 302 may be a device for moving a mechanism or a power mechanism, and may include, for example, at least one wheel 390 rotatably connected to the first housing 301. The at least one wheel 390 may support a weight of the electronic device 300, and may function to transmit a driving force (or a braking force) to a surface on which the electronic device 300 is placed. A control circuit (for example, the processor 120 of FIG. 1) may control the driving unit 302, and accordingly, a direction of rotation of the at least one wheel 390, a rotation angle, an amount of rotation, a rotation speed, a rotation acceleration, or an angular speed of rotation may be controlled, such that a movement (or motion) of the electronic device 300 is controlled.

According to an embodiment, one pair of driving units 302 may be provided, and a rotation axis (not shown) of the wheel 390 of one driving unit 302, and a rotation axis (not shown) of the wheel 390 of the other driving unit 302 may be parallel to each other and may be on the same straight line.

According to an embodiment, the first housing 301 may include a first surface (or a front surface) 301a facing in a first direction 3001 (for example, the +z axis direction), and a second surface (or a rear surface) (not shown) facing in a second direction 3002 (for example, the −z axis direction) which is opposite to the first direction 3001. The second surface may face the surface on which the electronic device 300 is placed. The at least one wheel 390 may be disposed to protrude with respect to the second surface. According to various embodiments, the first housing 301 may include a hole 305 formed to penetrate from the first surface 301a to the second surface, and the wheel 390 may be disposed in the hole 305 to protrude with respect to the first surface 301a.

According to various embodiments, the number or positions of the wheels, or a shape of the first housing 301 are not limited to the example shown in FIGS. 2A and 2B, and may be implemented differently. According to various embodiments, the driving unit may be implemented by various other mechanisms causing a movement of the electronic device 300.

According to a certain embodiment (not shown), the driving unit may have a shape to be movable in the vertical direction and the horizontal direction or to be rotatable with reference to at least one axis, or may be used to mechanically change other components. The driving unit may have a shape to be rotatable about at least one axis, and the shape may be implemented variously by combining a driving motor. For example, referring to FIG. 2C, an electronic device (for example, a mobile robot) 200c according to various embodiments may include a first device 210c having a spherical housing 211c, and a second device 220c disposed on a surface of the spherical housing 211c. The first device 210c may include a first driving device (not shown) disposed in the spherical housing 211c to transmit a driving force to the spherical housing 211c. The first driving device (not shown) may include, for example, at least one wheel which is in contact with an inner spherical surface of the spherical housing. When the first driving device rotates the wheel, the spherical housing 211c may be rotated, and accordingly, the first device 210c may be moved by the rotation of the spherical housing 211c. The first device 210c may include a structure (not shown) disposed in the spherical housing 211c to dispose the second device 220c on the surface of the spherical housing 211c, and a second driving device (not shown) to cause a movement of the structure. When the second driving device moves the structure, the second device 220c may be moved along with the structure due to attraction between the second device 220c and the structure (for example, attraction using a magnet). According to an embodiment, the second device 220c may include a housing 221c having an inner circumference surface 221d that faces the spherical surface of the spherical housing 211c and is not exposed to the outside, and an outer circumference surface 221e that is exposed to the outside and forms a portion of the exterior of the electronic device 200c. According to an embodiment, the housing 221c of the second device 220c may be an annular housing that is disposed on the spherical housing 211c of the first device 210c. According to an embodiment, the second device 220c may include various electronic components (for example, a camera 222c, a display, a microphone, a speaker, a sensor, or a battery) disposed in the second housing 221c. According to various embodiments, the second device 220c may be attachable to and detachable from the first device 210c.

Referring to FIGS. 2A and 2B, in an embodiment, the electronic device 300 may be driven by using power from a battery (for example, a first battery 501 or a second battery 502) disposed in the first housing 301. According to an embodiment, the battery charging device (for example, the docking station) 400 may be a device that interacts with the electronic device 300 regarding battery replacement. For example, the electronic device 300 may transfer a battery having a remaining capacity less than or equal to a threshold value to the battery charging device 400, and the battery charging device 400 may transfer a battery having a remaining capacity that is greater than the threshold value or is fully charged to the electronic device 300. The battery charging device 400 may charge a battery less than or equal to the threshold value, transferred from the electronic device 300, by using a power source.

According to an embodiment, the electronic device 300 may include a first battery mounting portion 310 provided on the first housing 301, and the battery charging device 400 may include a second battery mounting portion 410 provided on a second housing 401. According to various embodiments, referring to FIG. 2C, when the electronic device 200c includes the first device 210c including the spherical housing 211c, and the second device 220c which is movable on the spherical housing 211c, the first battery mounting portion may be included in the second device 220c. For example, referring to FIG. 2A, when the electronic device 300 and the battery charging device 400 interact with each other regarding battery replacement, the first battery 501 may be disposed in the second battery mounting portion 410 and the second battery 502 may be disposed in the first battery mounting portion 310. For example, referring to FIG. 2B, when the electronic device 300 and the battery charging device 400 interact with each other regarding battery replacement, the first battery 501 may be disposed in the first battery mounting portion 310 and the second battery 502 may be disposed in the second battery mounting portion 410. The interaction between the electronic device 300 and the battery charging device 400 regarding battery replacement may indicate a time period in which the electronic device 300 and the battery charging device 400 replace the battery while facing adjacent to each other.

According to an embodiment, when a battery disposed in the first battery mounting portion 310 has a remaining capacity less than or equal to the threshold value, the electronic device 300 may approach the battery charging device 400, such that the first battery mounting portion 310 is aligned, facing the second battery mounting portion 410. The electronic device 300 may separate the battery having the remaining capacity less than or equal to the threshold value from the first battery mounting portion 310, and may move the battery to the second battery mounting portion 410 of the battery charging device 400. The battery charging device 400 may separate another battery having a remaining capacity greater than the threshold value or fully charged from the second battery mounting portion 410, and may move the battery to the first battery mounting portion 310 of the electronic device 300.

According to an embodiment, the first battery mounting portion 310 may include a first space (or a first slot) (not shown) to have the first battery 501 disposed therein, and a second space (or a second slot) (not shown) to have the second battery 502 disposed therein. The first space may be provided to correspond to a shape and a size of the first battery 501, and the second space may be provided to correspond to a shape and a size of the second battery 502. According to an embodiment, the first space and the second space may be connected with each other to form one space. According to various embodiments, the first space and the second space may be divided from each other with a wall being disposed therebetween.

According to various embodiments, the first battery mounting portion 310 may include a recess to provide the first space and the second space. For example, when the electronic device 300 and the battery charging device 400 interact with each other regarding battery replacement, the first battery 501 or the second battery 502 may be inserted into the recess or separated from the recess in a third direction 3003 (for example, the y-axis direction) orthogonal to the first direction 3001 (or the second direction 3002). According to various embodiments, the first battery mounting portion 310 is not limited to the example shown in FIG. 2A or 2B, and may be formed in various other shapes. For example, the first battery mounting portion 310 may include a portion (for example, an extended portion of the first housing 301) to cover a battery disposed in the first battery mounting portion 310 not to be seen at least in part when it is viewed from the first direction 3001.

According to an embodiment, the second battery mounting portion 410 may include a third space (not shown) to have the first battery 501 disposed therein, and a fourth space (not shown) to have the second battery 502 disposed therein. The third space may be provided to correspond to the shape and the size of the first battery 501, and the fourth space may be provided to correspond to the shape and the size of the second battery 502. According to an embodiment, the third space and the fourth space may be connected with each other to form one space. According to various embodiments, the third space and the fourth space may be divided with a wall being disposed therebetween. When the electronic device 300 and the battery charging device 400 interact with each other regarding battery replacement, the third space of the second battery mounting portion 410 may be aligned, facing the first space of the first battery mounting portion 310, and the fourth space of the second battery mounting portion 410 may be aligned, facing the second space of the first battery mounting portion 310.

According to various embodiments, the second battery mounting portion 410 may include a recess to provide the third space and the fourth space. For example, when the electronic device 300 and the battery charging device 400 interact with each other regarding battery replacement, the first battery 501 or the second battery 502 may be inserted into the recess or may be separated from the recess in the third direction 3003. According to various embodiments, the second battery mounting portion 410 is not limited to the example shown in FIG. 2A or 2B, and may be formed in various other shapes. For example, the second battery mounting portion 410 may include a portion (for example, an extended portion of the second housing 401) to cover a battery disposed in the second battery mounting portion 410 not to be seen at least in part when it is viewed from the first direction 3001.

According to an embodiment, the first battery 501 may have the same shape and size as those of the second battery 502. According to a certain embodiment, the first battery 501 may have a different shape or size from that of the second battery 502. According to various embodiments, the first battery 501 may have the same or different battery capacity as or from that of the second battery 502.

According to an embodiment, the first battery mounting portion 310 may include at least one first terminal 321 which is electrically connected with the first battery 501 when the first battery 501 is disposed in the first battery mounting portion 310. The first battery mounting portion 310 may include at least one second terminal 322 which is electrically connected with the second battery 502 when the second battery 502 is disposed in the first battery mounting portion 310. The at least one first terminal 321 and the at least one second terminal 322 may be electrically connected with a first printed circuit board (PCB) 320.

According to an embodiment, the second battery mounting portion 410 may include at least one third terminal 421 which is electrically connected with the first battery 501 when the first battery 501 is disposed in the second battery mounting portion 410. The second battery mounting portion 410 may include at least one fourth terminal 422 which is electrically connected with the second battery 502 when the second battery 502 is disposed in the second battery mounting portion 410.

According to an embodiment, while the electronic device 300 and the battery charging device 400 are interacting with each other regarding battery replacement, the first terminal 321 of the first battery mounting portion 310 may face the third terminal 421 of the second battery mounting portion 410 with the first battery 501 being disposed therebetween, and the second terminal 322 of the first battery mounting portion 310 may face the fourth terminal 422 of the second battery mounting portion 410 with the second battery 502 being disposed therebetween.

According to an embodiment, while the electronic device 300 and the battery charging device 400 are interacting with each other regarding battery replacement, the first terminal 321 may be electrically connected with one surface of the first battery 501, and the third terminal 421 may be electrically connected with the other surface of the first battery 501. While the electronic device 300 and the battery charging device 400 are interacting with each other regarding battery replacement, the second terminal 322 may be electrically connected with one surface of the second battery 502, and the fourth terminal 422 may be electrically connected with the other surface of the second battery 502. In a state where the first battery 501 is electrically connected with the first terminal 321 and the second battery 502 is electrically connected with the second terminal 322, the electronic device 300 may control at least one switch circuit (for example, a transistor) to move (or change) a power source of the electronic device 300 from a battery to be transferred to the battery charging device 400 to a battery to be received from the battery charging device 400. The electronic device 300 may change a flow of a current from the battery to be transferred to the battery charging device 400 to the battery to be received from the battery charging device 400 without tuning off the power source.

According to an embodiment, by the interaction between the electronic device 300 and the battery charging device 400 regarding battery replacement, one battery having a remaining capacity less than or equal to the threshold value may be transferred to the battery charging device 400 from the electronic device 300, and another battery having a remaining capacity greater than the threshold or fully charged may be transferred to the electronic device 300 from the battery charging device 400. Compared to a method of charging a battery with an electronic device staying in a charging device for a time required to charge, this method enables the electronic device 300 to guarantee driving power more rapidly and to maintain a work that the electronic device has performed without interruption. Since the battery charging device 400 charges the battery transferred from the electronic device 300, driving power of the electronic device can be rapidly guaranteed.

Figure 3:
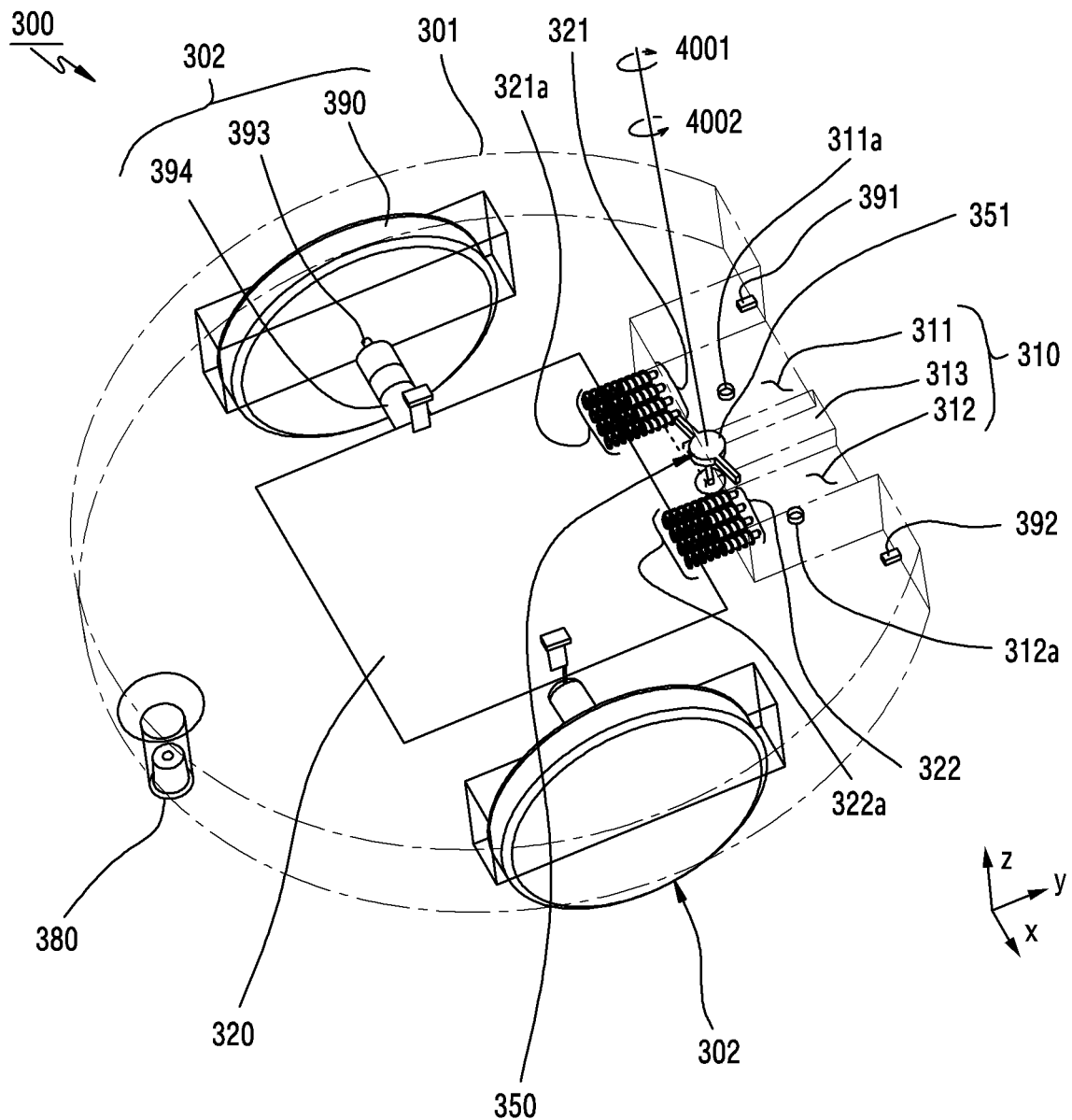
FIG. 3 is a perspective view of an electronic device according to an embodiment.
Figure 4:
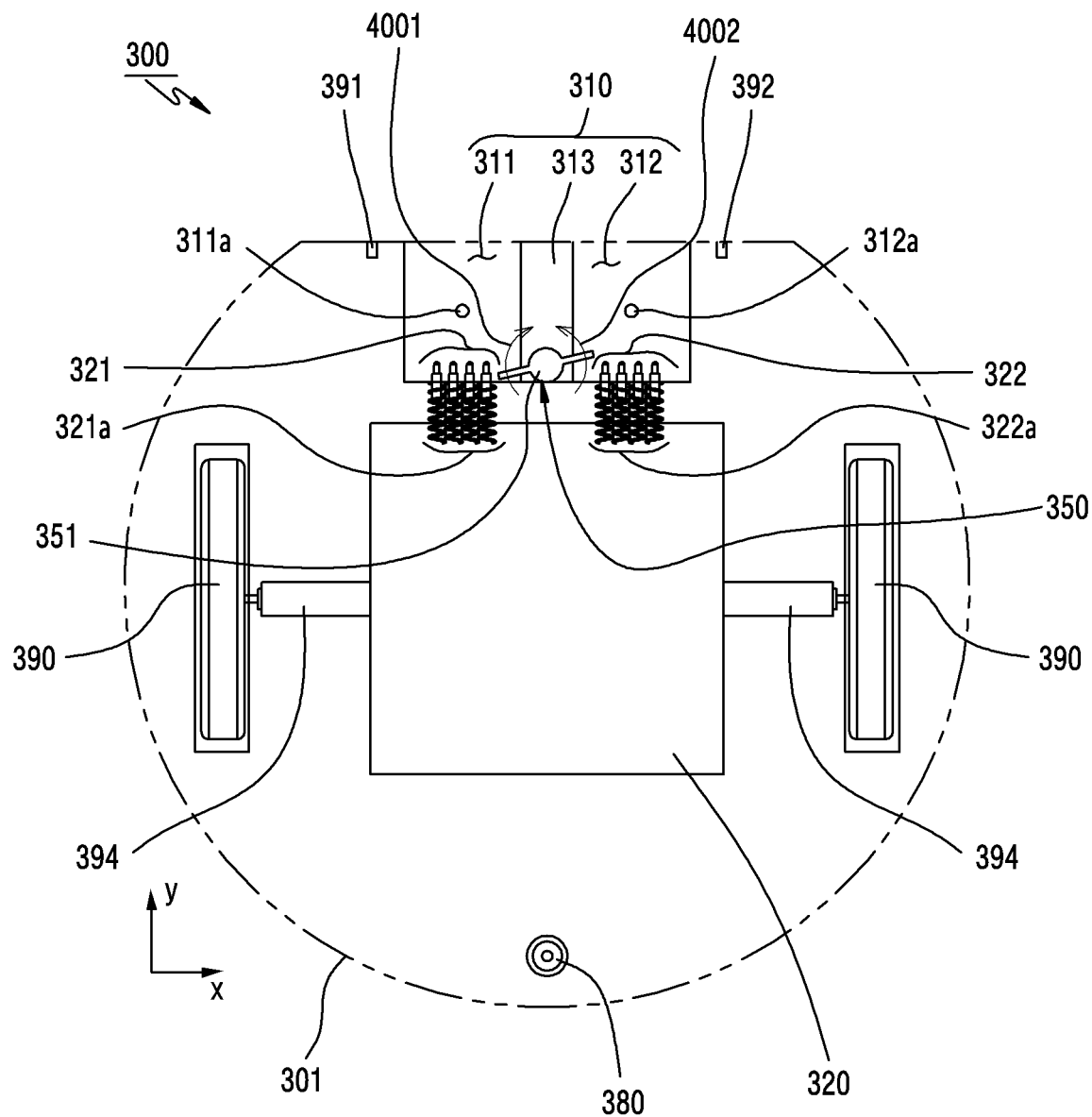
FIG. 4 is a plane view of an electronic device when it is viewed from the front according to an embodiment.
Figure 5:
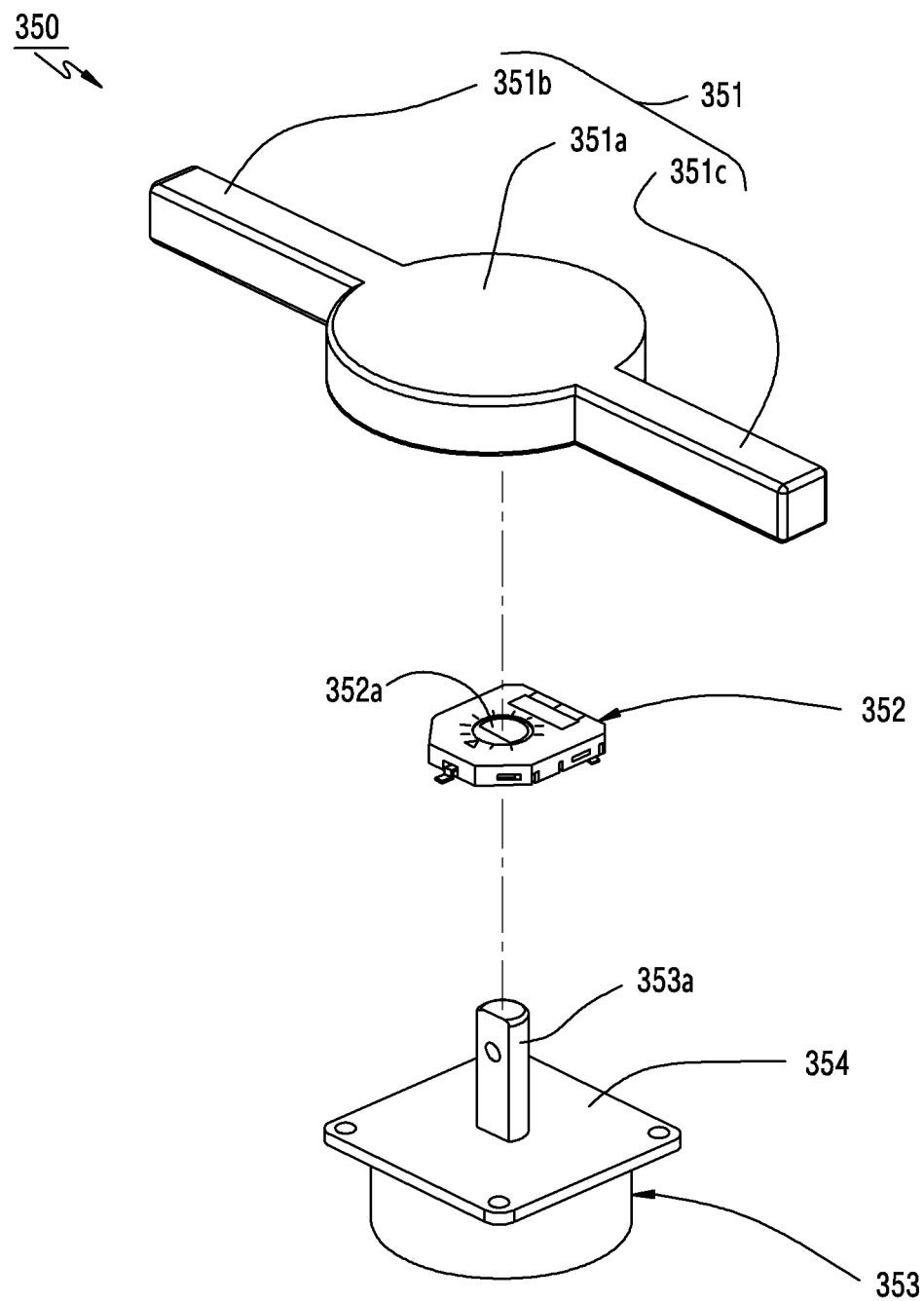
FIG. 5 is an exploded perspective view of a first separation device according to an embodiment.

FIG. 3 is a perspective view of an electronic device according to an embodiment. FIG. 4 is a plane view of the electronic device when it is viewed from the front according to an embodiment. FIG. 5 is an exploded perspective view of a first separation device according to an embodiment.

Referring to FIGS. 3 and 4, the first PCB 320 on which electronic components such as a processor (for example, the processor 120 of FIG. 1), a memory (for example, the memory 130 of FIG. 1) are disposed may be accommodated in the first housing 301. The first PCB 320 may be disposed substantially in parallel with a first surface (for example, the first surface 301*a* of FIG. 2A or 2B) of the first housing 301.

According to an embodiment, the driving unit 302 may be disposed on both sides of the first PCB 320, respectively, and may include at least one of the wheel 390, a motor 394 electrically connected with the first PCB 320, and a rotation shaft 393 connecting the motor 394 or the wheel 390. According to an embodiment, at least one motor driving circuit (for example, a motor driver or a motor controller) (not shown) may be disposed on the first PCB 320. The at least one motor driving circuit may be electrically connected with the motor 394, and may output a corresponding signal to the motor 394 under control of the processor (for example, the processor 120 of FIG. 1). According to an embodiment, the processor may control the motor 394 based on instructions or a program (for example, the program 140 of FIG. 1) stored in the memory (for example, the memory 130 of FIG. 1) included in the electronic device 300.

According to an embodiment, the electronic device 300 may include a support member 380 disposed on a second surface (for example, the rear surface opposite to the first surface 301*a* of FIG. 2A or 2B) of the first housing 301. The support member 380 may be disposed to protrude from the second surface. The support member 380 may prevent the first housing 301 from being inclined to one side and from coming into contact with the surface on which the electronic device 300 is placed due to a reaction or moment when the wheel 390 is rotated. According to an embodiment, the support member 380 may include a rolling member (for example, a ball caster) or a sliding member which is rotatable with respect to the surface on which the electronic device 300 is placed.

According to an embodiment, the electronic device 300 may include a balance weight (not shown). The balance weight may be formed by the first housing 301 or members included therein. The balance weight may form a center of gravity of the electronic device 300 at a position spaced in a direction orthogonal to the rotation shaft 393 of the wheel 390, and accordingly, the support member 390 may be maintained in contact with the surface on which the electronic device 300 is placed.

According to an embodiment, the first battery mounting portion 310 may include a first slot 311 to have a first battery (for example, the first battery 501 of FIG. 2A or 2B) mounted therein or dismounted therefrom, and a second slot 312 to have a second battery (for example, the second battery 502 of FIG. 2A or 2B) mounted therein or dismounted therefrom. The first slot 311 may include a recess to have at least a portion of the first battery disposed therein. The second slot 312 may include a recess to have at least a portion of the second battery disposed therein. According to an embodiment, the first battery mounting portion 310 may include a first wall 313 disposed between the first slot 311 and the second slot 312 to divide the first slot 311 and the second slot 312

According to an embodiment, at least one first terminal 321 may be disposed in the first slot 311, and at least one second terminal 322 may be disposed in the second slot 312. When the first battery is disposed in the first slot 311, the at least one first terminal 321 may be disposed to face one surface of the first battery and to be electrically connected therewith. When the second battery is disposed in the second slot 312, the at least one second terminal 322 may be disposed to face one surface of the second battery and to be electrically connected therewith. For example, the at least one first terminal 321 may be fixed to the first housing 301 and may protrude toward a space of the first slot 311, and the at least one second terminal 322 may be fixed to the first housing 301 and may protrude toward a space of the second slot 312.

According to an embodiment, when the first battery is disposed in the first slot 311, the at least one first terminal 321 may elastically come into contact with the first battery. When the second battery is disposed in the second slot 312, the at least one second terminal 322 may elastically come into contact with the second battery. For example, at least one first compression spring 321a may provide an elastic structure to the at least one first terminal 321, and at least one second compression spring 322a may provide an elastic structure to the at least one second terminal 322.

According to an embodiment, a first protrusion 311a may be disposed on one surface (for example, a surface facing in the +z axis direction (first direction 3001 of FIG. 2A)) of the first slot 311. When the first battery is disposed in the first slot 311, the first protrusion 311a may be inserted into a groove formed on the first battery. The at least one first terminal 321 may apply an elastic force to the first battery 501 in a direction of separating the first battery, but the position of the first battery in the first slot 311 may be maintained by coupling between the first protrusion 311a and the groove formed on the first battery. According to various embodiments, the first protrusion 311a may be implemented by an elastic structure such as a ball caster. According to various embodiments, the first protrusion 311a may be disposed on another surface of the first slot 311.

According to an embodiment, a second protrusion 312a may be disposed on one surface (for example, a surface facing in the +z axis direction) of the second slot 312. The second battery may include a groove formed to correspond to the second protrusion 312a. The at least one second terminal 322 may apply an elastic force to the second battery in a direction of separating the second battery, but the position of the second battery in the second slot 312 may be maintained by coupling between the second protrusion 312a and the groove formed on the second battery. According to various embodiments, the second protrusion 312a may be implemented by an elastic structure such as a ball caster.

According to various embodiments, the second protrusion 312a may be disposed on another surface of the second slot 312.

According to an embodiment, the electronic device 300 may include one or more sensors 391, 392 (for example, the sensor module 176 of FIG. 1). The electronic device 300 may approach a battery charging device (for example, the battery charging device 400 of FIG. 2A or 2B) with the first battery mounting portion 310 being aligned, facing a second battery mounting portion (for example, the second battery mounting portion 410 of FIG. 2A or 2B), by using the one or more sensors 391, 392.

For example, the one or more sensors 391, 392 may include an optical sensor to detect light of a set frequency range such as infrared rays. The battery charging device (for example, the battery charging device 400 of FIG. 2A or 2B) may include at least one light source (for example, a light emitting diode (LED)). According to an embodiment, the one or more sensors 391, 392 may include a first sensor 391 and a second sensor 392 which are disposed on both sides with reference to the first battery mounting portion 310. The battery charging device may include a first light source and a second light source which are disposed on both sides with reference to the second battery mounting portion (for example, the second battery mounting portion 410 of FIG. 2A or 2B). When a remaining capacity of a battery disposed in the first battery mounting portion 310 is less than or equal to a threshold value, the electronic device 300 may move to the battery charging device (for example, the battery charging device 400 of FIG. 2A or 2B) based on map information stored in the memory (for example, the memory 130 of FIG. 1). The electronic device 300 moving in the proximity of the battery charging device may approach the battery charging device when light of the set frequency range is detected from all of the first sensor 391 and the second sensor 392. When the first sensor 391 is aligned facing the first light source and the second sensor 392 is aligned facing the second light source, the light of the set frequency range may be detected from all of the first sensor 391 and the second sensor 392, and the first battery mounting portion 310 may be aligned facing the second battery mounting portion. The electronic device 300 may control the driving unit 302 such that light of the set frequency range is detected from all of the first sensor 391 and the second sensor 392.

According to various embodiments, the at least one sensor 370 may be implemented by various other sensors.

According to an embodiment, when the battery disposed in the first battery mounting portion 310 has a remaining capacity less than or equal to the threshold value, the processor (for example, the processor 120 of FIG. 1) of the electronic device 300 may implement a mode (hereinafter, a battery replacement mode) for replacing the battery. In the battery replacement mode, the processor may move the electronic device 300 to the battery charging device (for example, the battery charging device 400 of FIG. 2A or 2B), and may replace the battery with a battery of the battery charging device. According to an embodiment, the electronic device 300 may include a first separation device 350 to transfer the battery to the battery charging device (for example, the battery charging device 400 of FIG. 2A or 2B) from the first battery mounting portion 310. According to a certain embodiment, the first separation device 350 may be referred to as a first transfer device.

Referring to FIGS. 3, 4, and 5, in an embodiment, the first separation device 350 may include a first lever 351 which is rotatably coupled to the first battery mounting portion 310. According to an embodiment, the first lever 351 may be disposed on the first wall 313. According to an embodiment, the first lever 351 may include a center portion 351a connected with a rotation shaft 353a of a motor 353, a first extension portion 351b extended from the center portion 351a toward the first slot 311, and a second extension portion 351c extended from the center portion 351a toward the second slot 312. The first extension portion 351b and the second extension portion 351c may be extended in the opposite directions with reference to the center portion 351a. According to an embodiment, while the electronic device 300 and the battery charging device (for example, the battery charging device 400 of FIG. 2A or 2B) are interacting with each other regarding battery replacement, when the first lever 351 is rotated in a first direction 4001 with the first battery being disposed in the first slot 311, the first battery may be pressed by the first extension portion 351b and may be transferred to the second battery mounting portion (for example, the second battery mounting portion 410 of FIG. 2A or 2B) from the first battery mounting portion 310. According to an embodiment, while the electronic device 300 and the battery charging device are interacting with each other regarding battery replacement, when the first lever 351 is rotated in a second direction 4002 opposite to the first direction 4001 with the second battery being disposed in the second slot 312, the second battery may be pressed by the second extension portion 351c and may be transferred to the second battery mounting portion from the first battery mounting portion 310.

According to an embodiment, when the electronic device 300 is aligned in the proximity of the battery charging device (for example, the battery charging device 400 of FIG. 2A or 2B) and then approaches, the first battery mounting portion 310 may move to a second position which is closer to the second battery mounting portion 410 via a first position. For example, referring to FIGS. 2A, 4, and 5, when the first battery mounting portion 310 moves from the first position to the second position with respect to the second battery mounting portion 410, the first battery 501 disposed in the second battery mounting portion 410 may be inserted into the first slot 311 of the first battery mounting portion 310 and may press the first extension portion 351b of the first lever 351, and the first lever 351 may be rotated by a set first angle (for example, about 2°) in the second direction 4002. When the first battery mounting portion 310 moves from the first position to the second position with respect to the second battery mounting portion 410, the first battery 501 may be inserted into the first slot 311 of the first battery mounting portion 310 and may come into contact with the at least one first terminal 321. According to an embodiment, the electronic device 300 may detect that the first lever 351 is rotated by the set first angle (for example, about 2°) in the second direction 4002 through at least one sensor. When it is detected that the first lever 351 is rotated by the set first angle (for example, about 2°) in the second direction 4002, the electronic device 300 may recognize that the first battery 501 is inserted into the first slot 311, and may control the motor 353 connected to the first lever 351 to rotate the first lever 351 by a set second angle (for example, about 12°) in the second direction 4002. When the first lever 351 is rotated by the second angle in the second direction 4002, the second battery 502 may be transferred to the second battery mounting portion 410 from the first battery mounting portion 310 by the second extension portion 351c of the first lever 351.

For example, referring to FIGS. 2B, 4, and 5, when the first battery mounting portion 310 moves from the first position to the second position with respect to the second battery mounting portion 410, the second battery 502 disposed in the second battery mounting portion 410 may be inserted into the second slot 312 of the first battery mounting portion 310 and may press the second extension portion 351c of the first lever 351, and the first lever 351 may be rotated by the set first angle (for example, about 2°) in the first direction 4001. When the first battery mounting portion 310 moves from the first position to the second position with respect to the second battery mounting portion 410, the second battery 502 may be inserted into the second slot 312 of the first battery mounting portion 310 and may come into contact with the at least one second terminal 311. According to an embodiment, the electronic device 300 may detect that the first lever 351 is rotated by the set first angle (for example, about 2°) in the first direction 4001 through at least one sensor. When it is detected that the first lever 351 is rotated by the set first angle (for example, about 2°) in the first direction 4001, the electronic device 300 may recognize that the second battery 502 is inserted into the second slot 312, and may control the motor 353 connected to the first lever 351 to rotate the first lever 351 by the set second angle (for example, about 12°) in the first direction 4002. When the first lever 351 is rotated by the second angle in the first direction 4001, the first battery 501 may be transferred to the second battery mounting portion 410 from the first battery mounting portion 310 by the first extension portion 351b of the first lever 351.

According to an embodiment, the battery charging device (for example, the battery charging device 400 of FIG. 2A or 2B) may include a second separation device which is substantially the same as the first separation device 350 and includes a second lever. The second separation device may have substantially the same operation principle and structure as the first separation device. When it is detected that the second lever of the second separation device is rotated by a set first angle (for example, about 2°) in a set direction, the battery charging device 400 may rotate the second lever by a second angle (for example, about 12°) and may transfer the first battery 501 to the first battery mounting portion 310 of the electronic device 300, or may transfer the second battery 502 to the first battery mounting portion 310 of the electronic device 300.

Referring to FIG. 5, in an embodiment, the first separation device 350 may include a sensor 352 to detect a driving state (for example, information regarding rotation) of the motor 353 (or the first lever 351). The sensor 352 may be, for example, a motor encoder. The motor encoder may include a disc (not shown) coupled with the rotation shaft 353a of the motor 354 through a hole 352a, and a detector (not shown) to detect a rotation direction, a rotation angle, an amount of rotation, a rotation speed, a rotation acceleration, or an angular speed of rotation of the rotation shaft 353a, based on scales and marks on the disk which are electronically recognizable. The motor encoder may be disposed on a support member (for example, a bracket) 354 of a plate shape disposed on the motor 353. The electronic device 300 of FIG. 3 or 4 may detect a rotation direction and/or a rotation angle of the first lever 351 through the sensor 352.

Figure 6:
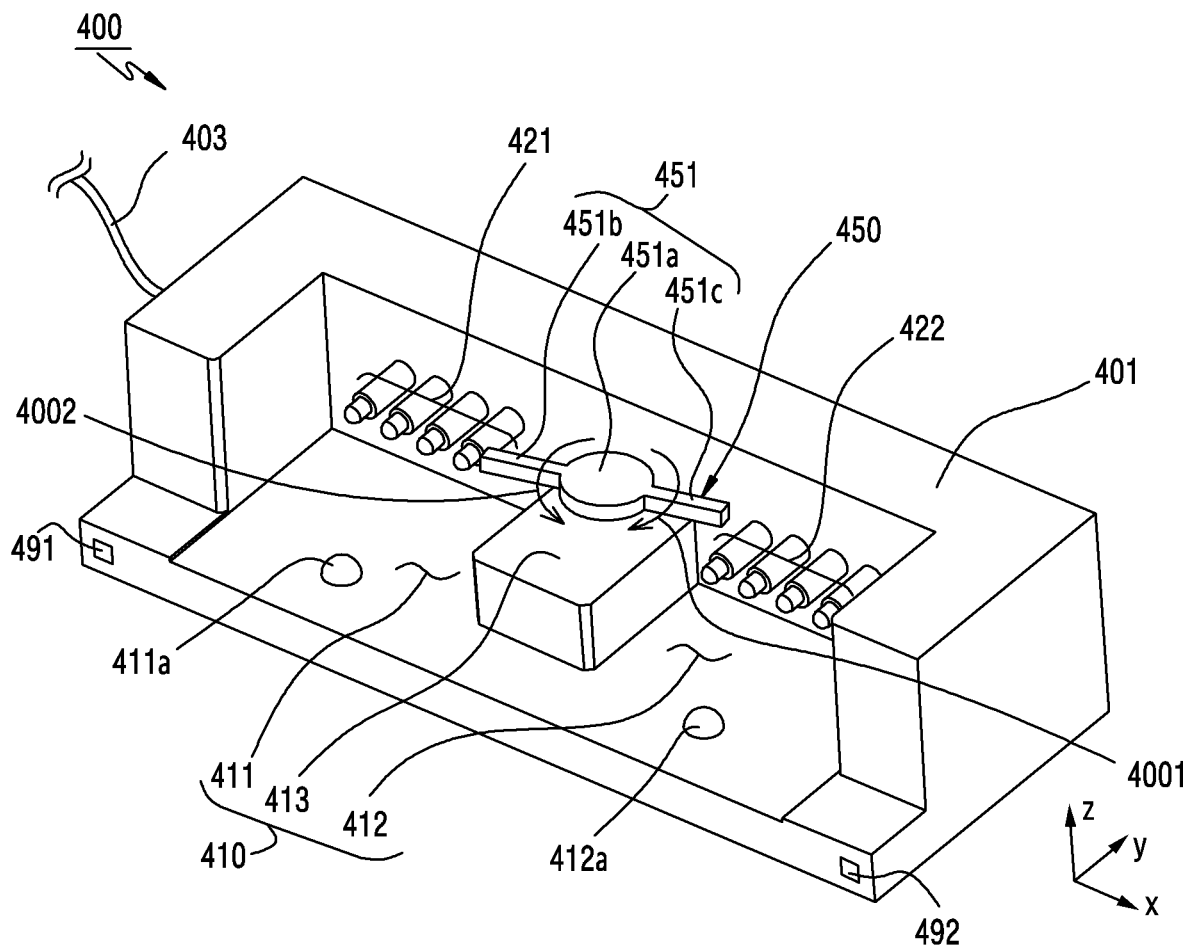
FIGS. 6 and 7 are views illustrating a battery charging device according to an embodiment.
Figure 7:
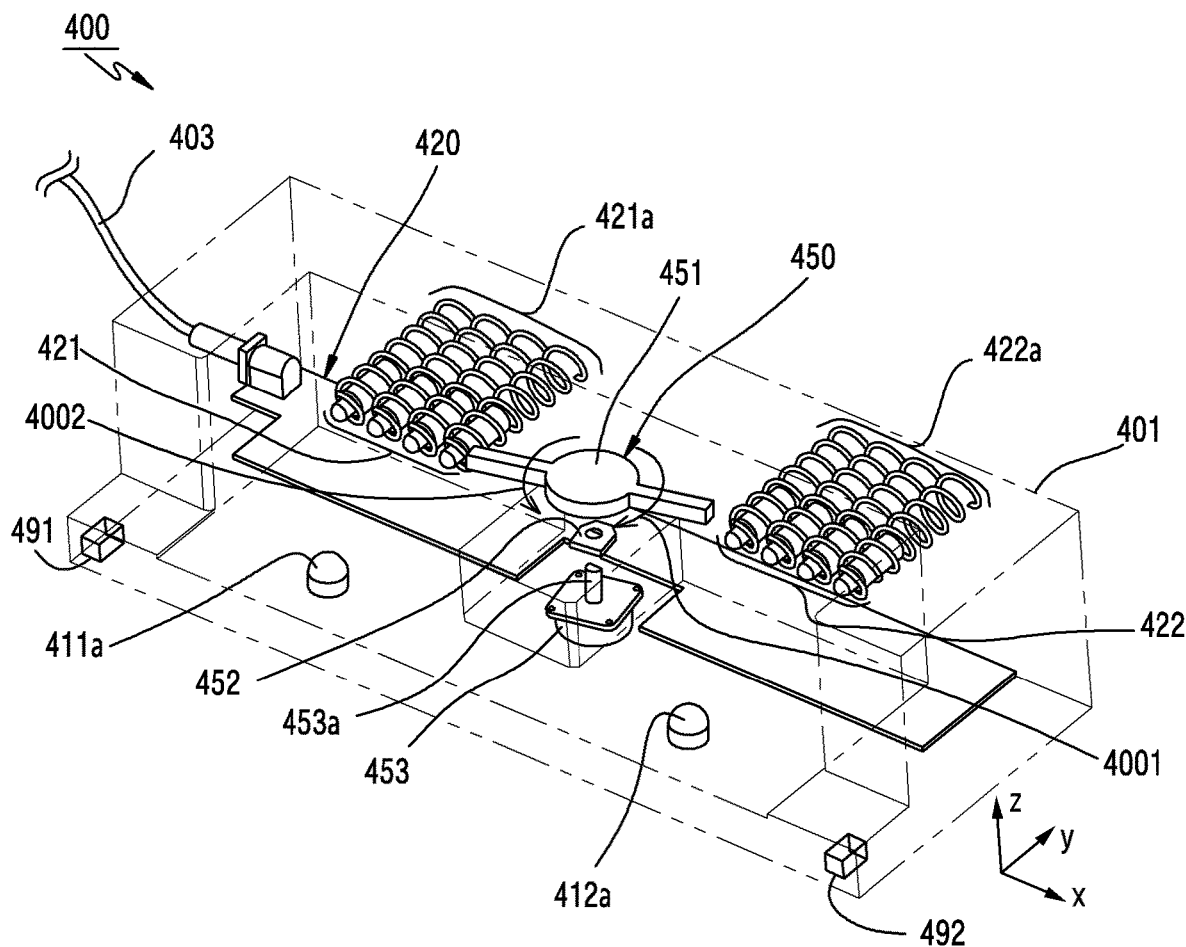

FIGS. 6 and 7 illustrate a battery charging device according to an embodiment.

Referring to FIGS. 6 and 7, in an embodiment, the battery charging device 400 may include the second housing 401 and the second battery mounting portion 410 provided in the second housing 401.

According to an embodiment, a second PCB 420 on which electronic components such as a processor, a memory, a charging circuit are disposed may be accommodated in the second housing 401. The second PCB 420 may be connected with an external power source through a conductive path 403 such as a cable.

According to an embodiment, the second battery mounting portion 410 may include a third slot 411 to have a first battery (for example, the first battery 501 of FIG. 2A or 2B) mounted therein or dismounted therefrom, and a fourth slot 412 to have a second battery (for example, the second battery 502 of FIG. 2A or 2B) mounted therein or dismounted therefrom. The third slot 411 may include a recess to have at least a portion of the first battery disposed therein. The fourth slot 412 may include a recess to have at least a portion of the second battery disposed therein. According to an embodiment, the second battery mounting portion 410 may include a second wall 413 disposed between the third slot 411 and the fourth slot 412 to divide the third slot 411 and the fourth slot 412.

According to an embodiment, at least one third terminal 421 may be disposed in the third slot 411, and at least one fourth terminal 422 may be disposed in the fourth slot 412. The at least one third terminal 421 and the at least one fourth terminal 422 may be electrically connected with the second PCB 420. When the first battery is disposed in the third slot 411, the at least one third terminal 421 may be disposed to face one surface of the first battery and to be electrically connected therewith. When the second battery is disposed in the fourth slot 412, the at least one fourth terminal 422 may be disposed to face one surface of the second battery and to be electrically connected therewith. For example, the at least one third terminal 421 may be fixed to the second housing 401 and may protrude toward a space of the third slot 411, and the at least one fourth-terminal 422 may be fixed to the second housing 401 and may protrude toward a space of the fourth slot 412.

According to an embodiment, when the first battery is disposed in the third slot 411, the at least one third terminal 421 may elastically come into contact with the first battery. When the second battery is disposed in the fourth slot 412, the at least one fourth terminal 422 may elastically come into contact with the second battery. For example, at least one third compression spring 421a may provide an elastic structure to the at least one third terminal 421, and at least one fourth compression spring 422a may provide an elastic structure to the at least one fourth terminal 422.

According to an embodiment, a third protrusion 411a may be disposed on one surface of the third slot 411. When the first battery is disposed in the third slot 411, the third protrusion 411a may be inserted into a groove formed on the first battery. The at least one third terminal 421 may apply an elastic force to the first battery in a direction of separating the first battery, but the position of the first battery in the third slot 411 may be maintained due to coupling between the third protrusion 411a and the groove formed on the first battery. According to various embodiments, the third protrusion 411a may be implemented by an elastic structure such as a ball caster. According to various embodiments, the third protrusion 411a may be disposed on another surface of the third slot 411.

According to an embodiment, a fourth protrusion 412a may be disposed on one surface of the fourth slot 412. The second battery may include a groove provided to correspond to the second protrusion 412a. The at least one fourth terminal 422 may apply an elastic force to the second battery in a direction of separating the second battery, but the position of the second battery in the fourth slot 412 may be maintained due to coupling between the fourth protrusion 412a and the groove formed on the second battery. According to various embodiments, the fourth protrusion 412a may be implemented by an elastic structure such as a ball caster. According to various embodiments, the fourth protrusion 412a may be disposed on another surface of the fourth slot 412.

According to an embodiment, the battery charging device 400 may include a first light source 491 and a second light source 492 which are disposed on both sides with reference to the second battery mounting portion 410. Referring to FIG. 3, when a remaining capacity of a battery disposed in the first battery mounting portion 310 is less than or equal to a threshold value, the electronic device 300 may move to the battery charging device 400 based on map information stored in the memory. The electronic device 300 moving in the proximity of the battery charging device may approach the battery charging device when light of the set frequency range is detected from all of the first sensor 391 and the second sensor 392. When the first sensor 391 is aligned facing the first light source 491 and the second sensor 392 is aligned facing the second light source 492, the light of the set frequency range may be detected from all of the first sensor 391 and the second sensor 392, and the first battery mounting portion 310 may be aligned, facing the second battery mounting portion 410.

According to an embodiment, the battery charging device 400 may include a second separation device 450 to transfer a battery to an electronic device (for example, the electronic device 300 of FIG. 3) from the second battery mounting portion 410. The second separation device 450 may include a second lever 451 which is rotatably coupled to the second battery mounting portion 410. According to an embodiment, the second lever 451 may be disposed on the second wall 413. According to an embodiment, the second lever 451 has substantially the same structure as the first lever 351 of FIG. 3, and may include a center portion 451a connected with a rotation shaft of a motor (not shown), a first extension portion 451b extended from the center portion 451a toward the third slot 411, and a second extension portion 451c extended from the center portion 451a toward the fourth slot 412. The first extension portion 451b and the second extension portion 451c may be extended in the opposite directions with reference to the center portion 451a. According to an embodiment, while the electronic device (for example, the electronic device 300 of FIG. 3) and the battery charging device 400 are interacting with each other regarding battery replacement, when the second lever 451 is rotated in the second direction 4002 with the first battery being disposed in the third slot 411, the first battery may be pressed by the first extension portion 451b and may be transferred to the first battery mounting portion (for example, the first battery mounting portion 310 of FIG. 3) from the second battery mounting portion 410. According to an embodiment, while the electronic device and the battery charging device 400 are interacting with each other regarding battery replacement, when the second lever 451 is rotated in the first direction 4001 opposite to the second direction 4002 with the second battery being disposed in the fourth slot 412, the second battery may be pressed by the second extension portion 451c and may be transferred to the first battery mounting portion from the second battery mounting portion 410.

According to an embodiment, when the electronic device (for example, the electronic device 300 of FIG. 3) is aligned in the proximity of the battery charging device 400 and then approaches, the first battery mounting portion (for example, the first battery mounting portion 310 of FIG. 3) may move to the second position which is closer to the second battery mounting portion 410 via the first position. For example, referring to FIGS. 2A and 6, when the first battery mounting portion 310 moves from the first position to the second position with respect to the second battery mounting portion 410, the second battery 502 disposed in the first battery mounting portion 310 may be inserted into the fourth slot 412 of the second battery mounting portion 410 and may press the second extension portion 451c of the second lever 451, and the second lever 451 may be rotated by the set first angle (for example, about 2°) in the second direction 4002. When the first battery mounting portion 310 moves from the first position to the second position with respect to the second battery mounting portion 410, the second battery 502 may be inserted into the fourth slot 412 of the second battery mounting portion 410 and may come into contact with the at least one fourth terminal 422. According to an embodiment, the battery charging device 400 may detect that the second lever 451 is rotated by the set first angle (for example, about 2°) in the second direction 4002 through at least one sensor. When it is detected that the second lever 451 is rotated by the set first angle (for example, 2°) in the second direction 4002, the battery charging device 400 may recognize that the second battery 502 is inserted into the fourth slot 412, and may control the motor connected to the second lever 451 to rotate the second lever 451 by the set second angle (for example, about 12°) in the second direction 4002. When the second lever 451 is rotated by the second angle in the second direction 4002, the first battery 501 may be transferred to the first battery mounting portion 310 from the second battery mounting portion 410 by the first extension portion 451b of the second lever 451.

For example, referring to FIGS. 2B and 6, when the first battery mounting portion 310 moves from the first position to the second position with respect to the second battery mounting portion 410, the first battery 501 disposed in the first battery mounting portion 310 may be inserted into the third slot 411 of the second battery mounting portion 410 and may press the first extension portion 451b of the second lever 451, and the second lever 451 may be rotated by the set first angle (for example, about 2°) in the first direction 4001. When the first battery mounting portion 310 moves from the first position to the second position with respect to the second battery mounting portion 410, the first battery 501 may be inserted into the third slot 411 of the second battery mounting portion 410 and may come into contact with the at least one third terminal 421. According to an embodiment, the battery charging device 400 may detect that the second lever 451 is rotated by the set first angle (for example, about 2°) in the first direction 4001 through at least one sensor. When it is detected that the second lever 451 is rotated by the set first angle (for example, about 2°) in the first direction 4001, the battery charging device 400 may recognize that the first battery 501 is inserted into the third slot 411, and may control the motor connected to the second lever 451 to rotate the second lever 451 by the set second angle (for example, about 12°) in the first direction 4001. When the second lever 451 is rotated by the second angle in the first direction 4001, the second battery 502 may be transferred to the first battery mounting portion 310 from the second battery mounting portion 410 by the second extension portion 451c of the second lever 451.

According to an embodiment, the second separation device 450 may have substantially the same operation principle and structure as the first separation device 350 of FIG. 5. For example, the second separation device 450 may include a sensor such as a motor encoder to detect a driving state (for example, information regarding rotation) of the second lever 451 or the motor connected with the second lever 451. The battery charging device 400 may detect a rotation direction and/or a rotation angle of the second lever 451 through the motor encoder.

Figure 8A:
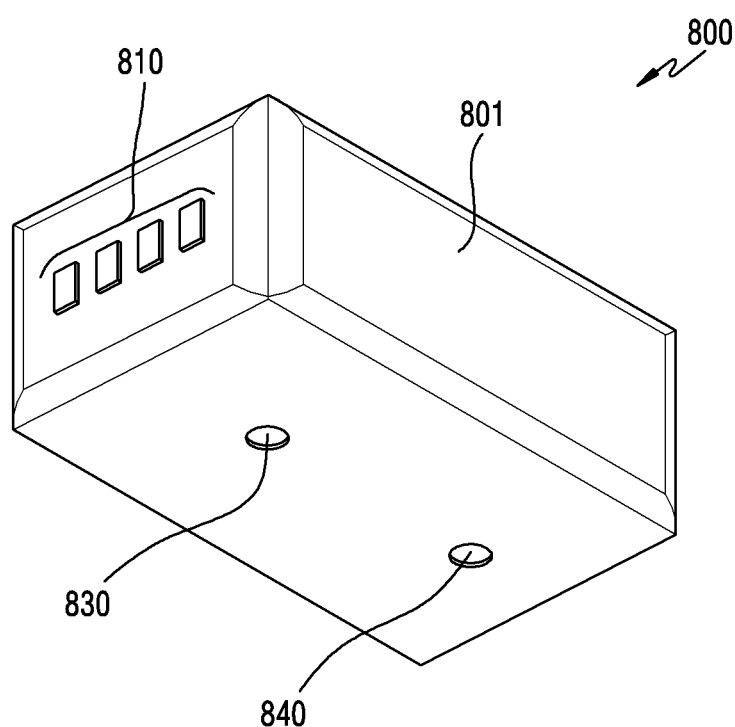
FIGS. 8A and 8B are views illustrating a battery according to an embodiment.
Figure 8B:
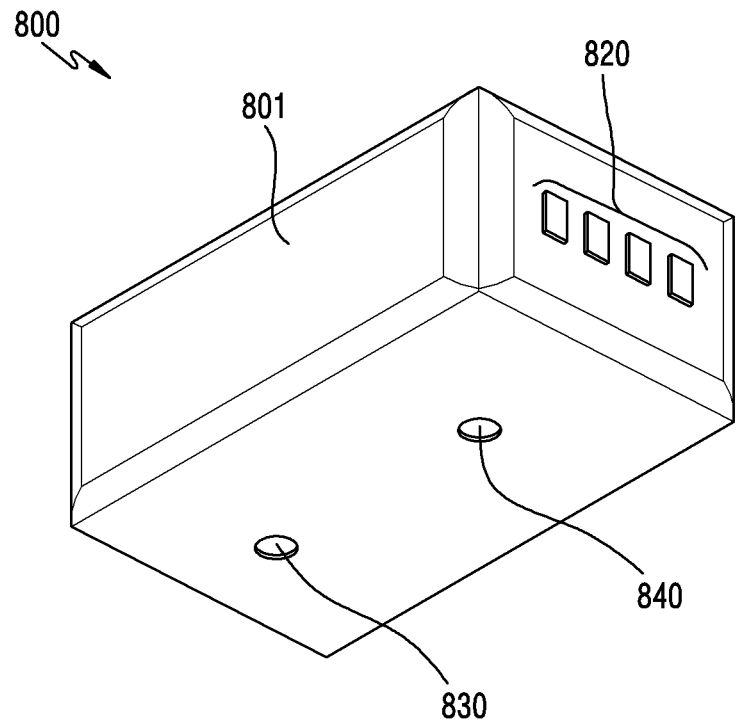
Figure 9:
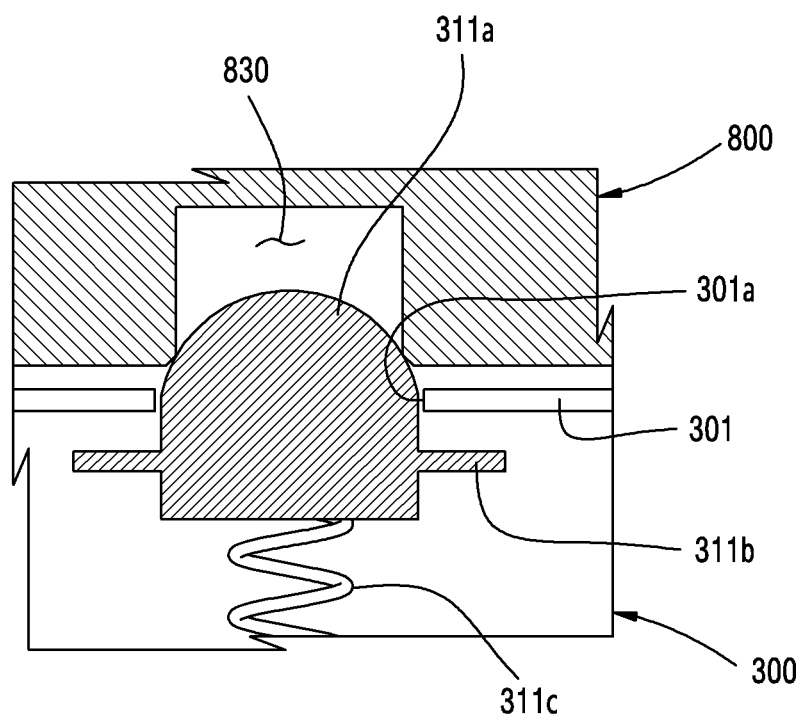
FIG. 9 is a view illustrating a coupling structure between a battery and an electronic device according to an embodiment.

FIGS. 8A and 8B illustrate a battery according to an embodiment. FIG. 9 illustrates a coupling structure between the battery and the electronic device according to an embodiment.

Referring to FIGS. 8A and 8B, in an embodiment, the battery 800 (for example, the first battery 501 or the second battery 502 of FIG. 2A or 2B) may include a cuboidal pouch 801. The battery 800 may include one or more first terminals 810 and one or more second terminals 820 which are disposed on one surface and the other surface disposed on opposite sides of the pouch 801, respectively.

According to an embodiment, the one or more first terminals 810 may be utilized to be electrically connected with the electronic device 300 of FIG. 2A or 2B, and the one or more second terminals 820 may be utilized to be electrically connected with the second battery charging device 400 of FIG. 2A or 2B.

According to various embodiments, the battery 800 (for example, a lithium ion battery) may include an electrode assembly (not shown) received in the pouch 801. The pouch 801 is a member that provides an inner space to accommodate the electrode assembly and an electrolyte, and may be substituted with various other terms such as 'can,' 'case,' 'housing,' 'exterior member.' The pouch 801 may be formed with metal such as aluminum or a nonmetallic material such as polymer. The electrode assembly may be a structure that is provided by overlapping an anode plate, a cathode plate, and a separator one another and winding altogether, and for example, may have a jelly roll shape. The electrode assembly may be disposed in the inner space of the pouch 801 along with the electrolyte by a series of processes of disposing the electrode assembly in the inner space of the pouch 801 and then injecting the electrolyte and sealing. The battery 800 may convert chemical energy owned by the anode plate and the cathode plate into electric energy.

According to an embodiment, a portion of the one or more first terminals 810 may be electrically connected with an anode tap connected to the anode plate, and a portion of the one or more first terminals 810 may be electrically connected with a cathode tap connected with the cathode plate. According to an embodiment, a portion of the one or more second terminals 820 may be electrically connected with the anode tap connected with the anode plate, and a portion of the one or more second terminals 820 may be electrically connected with the cathode tap connected with the cathode plate.

According to an embodiment, the battery 800 may include a first groove 830 and a second groove 840 which are formed on one of surfaces (not shown) enclosing between the surface on which the one or more first electrodes 810 are disposed and the surface on which the one or more second electrodes 820 are disposed. For example, referring to FIG. 9, when the battery 800 is disposed in the first slot 311 of FIG. 3 as the first battery, the first protrusion 311a may be inserted into the first groove 830. According to an embodiment, the first protrusion 311a may be disposed in the hole 305 formed on the first housing 301 and may be elastically coupled to the first groove 830 of the battery 800 by an elastic member 311c such as a compression spring. The first protrusion 311a may include an extension portion 311b to prevent the first protrusion from being released from the hole 305 formed on the first housing 301.

For example, when the battery 800 is disposed in the second slot 312 of FIG. 3 as the second battery, the second protrusion 312a may be inserted into the first groove 830. According to various embodiments, the coupling structure between the second protrusion 312a and the first groove 830 may be substantially similar to or the same as in FIG. 9.

For example, when the battery 800 is disposed in the third slot 411 of FIG. 6 as the first battery, the third protrusion 411a may be inserted into the second groove 840. According to various embodiments, the coupling structure between the third protrusion 411a and the second groove 840 may be substantially similar to or the same as in FIG. 9.

For example, when the battery 800 is disposed in the fourth slot 412 of FIG. 6 as the second battery, the fourth protrusion 412a may be inserted into the second groove 840. According to various embodiments, the coupling structure between the fourth protrusion 412a and the second groove 840 may be substantially similar to or the same as in FIG. 9.

Figure 10:
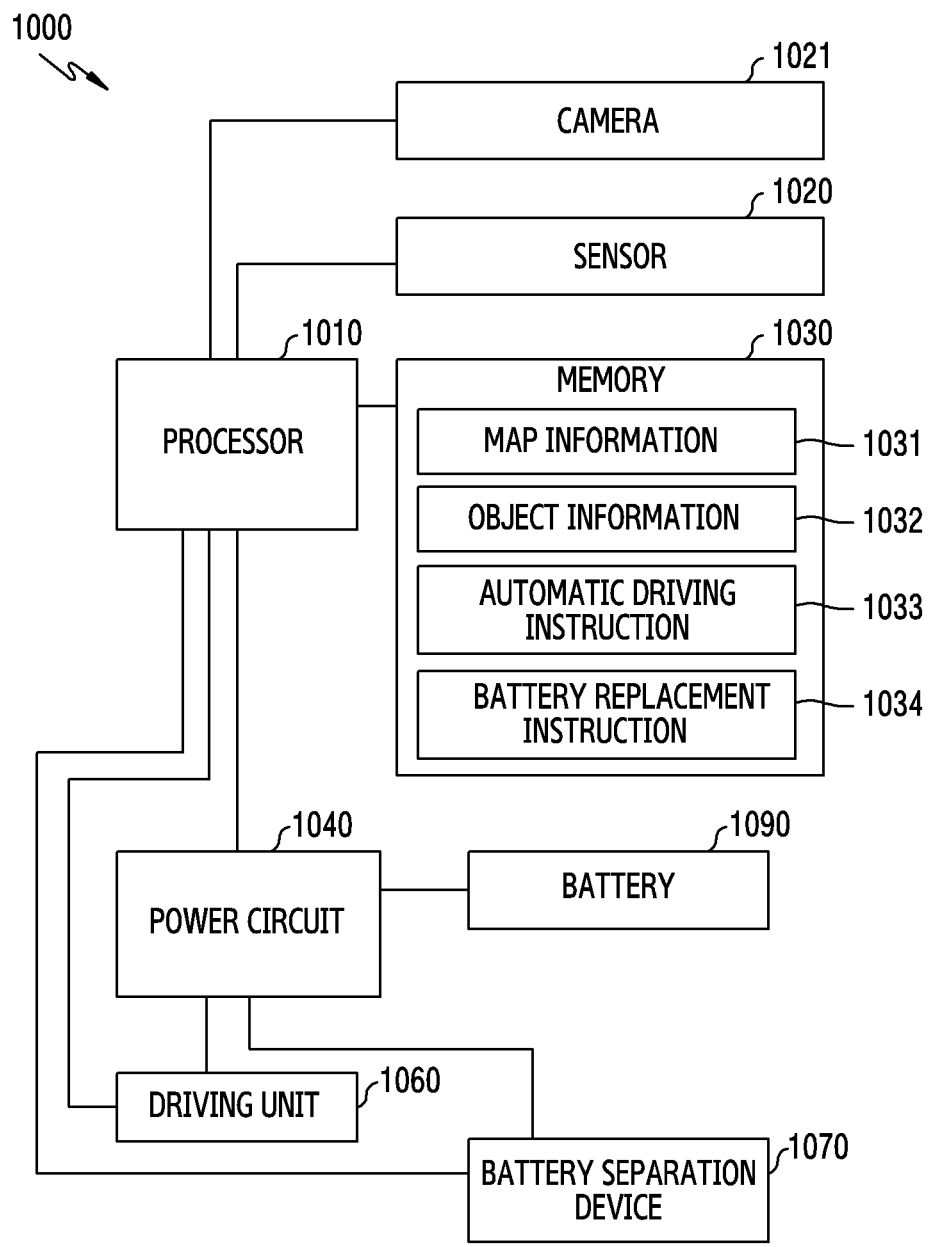
FIG. 10 is a block diagram of an electronic device according to an embodiment.

FIG. 10 is a block diagram of an electronic device according to an embodiment.

Referring to FIG. 10, in an embodiment, the electronic device 1000 (for example, the electronic device 300 of FIG. 2A or 2B) may include at least one of a processor 1010, a sensor 1020, a camera 1021, a memory 1030, a power circuit 1040, a driving unit 1060, a battery separation device 1070, or a battery 1090.

The processor 1010 (for example, the processor 120 of FIG. 1) may perform various operations based on information or instructions included in the memory 1030. According to an embodiment, the memory 1030 may include map information 1031, object information 1032, an automatic driving instruction 1033, or a battery replacement instruction 1034.

According to an embodiment, the automatic driving instruction 1033 may include a routine that causes the processor 1010 to control the driving unit 1060, based on the map information 1030, the object information 1032, and data obtained from the sensor 1020 and/or the camera 1021, in order to move the electronic device 1000 to a battery charging device (for example, the battery charging device 400 of FIG. 2A or 2B) when a remaining capacity of the battery 1090 is less than or equal to a threshold value. For example, the processor 1010 may detect an external object (for example, the battery charging device 400 of FIG. 2A or 2B) through the sensor 1020 (for example, the sensor module 176 of FIG. 1). For example, the processor 1010 may continuously acquire vision information through the camera 1021 (for example, a depth camera or an RGB camera, or the camera module 180 of FIG. 1), and may compare the vision information and the object information 1032.

According to an embodiment, the battery replacement instruction 1034 may include a routine that causes the processor 1010 to control the driving unit 1050, the power circuit 1040, or the battery separation device 1017, in order to replace the battery of the electronic device 1000 with a battery of the battery charging device (for example, the battery charging device 400 of FIG. 2A or 2B) when a remaining capacity of the battery 1090 is less than or equal to the threshold value.

For example, according to the battery replacement instruction 1034, the processor 1010 may control the driving unit 1060 to be aligned with the battery charging device and to approach the battery charging device, based on data acquired from the sensor 1020 or the camera 1021. According to an embodiment, the driving unit 1060 may include the driving unit 302 of FIG. 3, and a detailed description thereof is omitted.

For example, according to the battery replacement instruction 1034, the processor 1010 may control the power circuit 1040 to move a power source of the electronic device 100 from the battery 1090 to be transferred to the battery charging device to a battery to be received from the battery charging device, during a time period in which all of the battery 1090 to be transferred to the battery charging device, and the battery (not shown) to be received from the battery charging device are electrically connected with the power circuit 1040. According to an embodiment, the power circuit 1040 may provide an electric current required by a load such as the processor 1010 by using power from the battery 1090.

For example, according to the battery replacement instruction 1034, the processor 1010 may control the battery separation device 1070 to transfer the battery 1090 to the battery charging device (for example, the battery charging device 400 of FIG. 2A or 2B). According to an embodiment, the battery separation device 1070 may include the first separation device 350 of FIG. 3 or 5, and a detailed description thereof is omitted.

Figure 11:
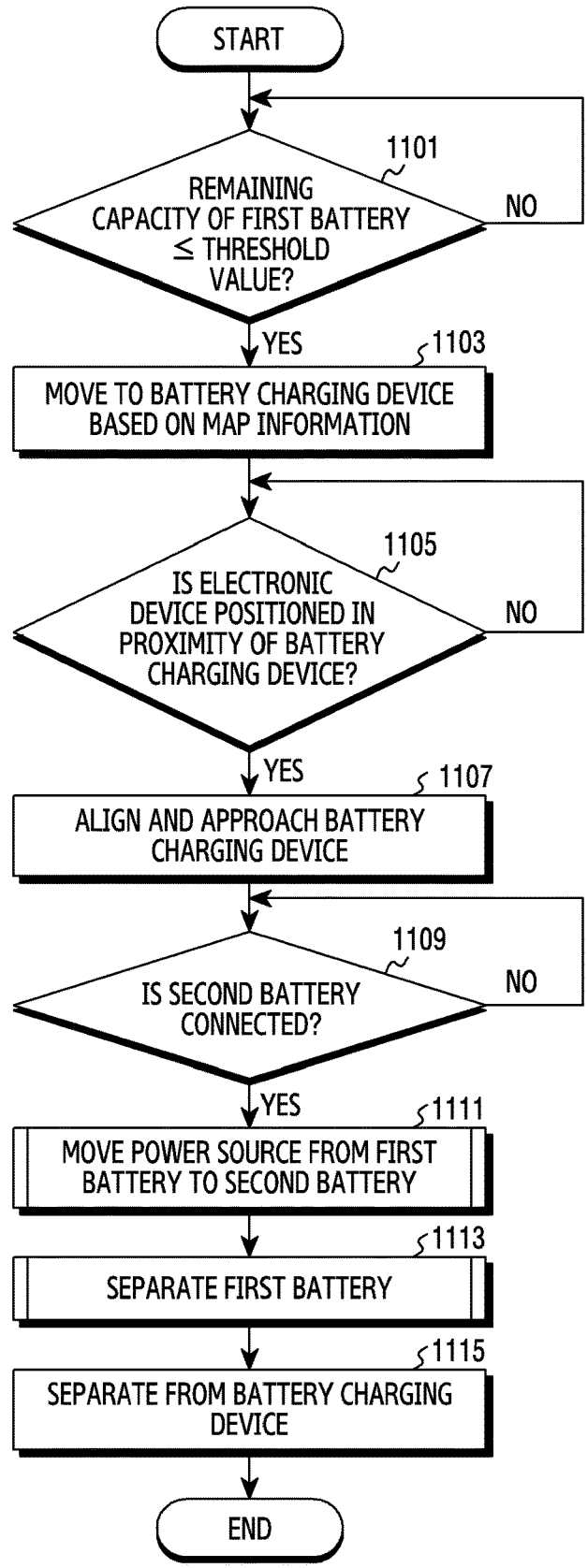
FIG. 11 is a view illustrating an operation flow regarding battery replacement in an electronic device according to an embodiment.
Figure 12:
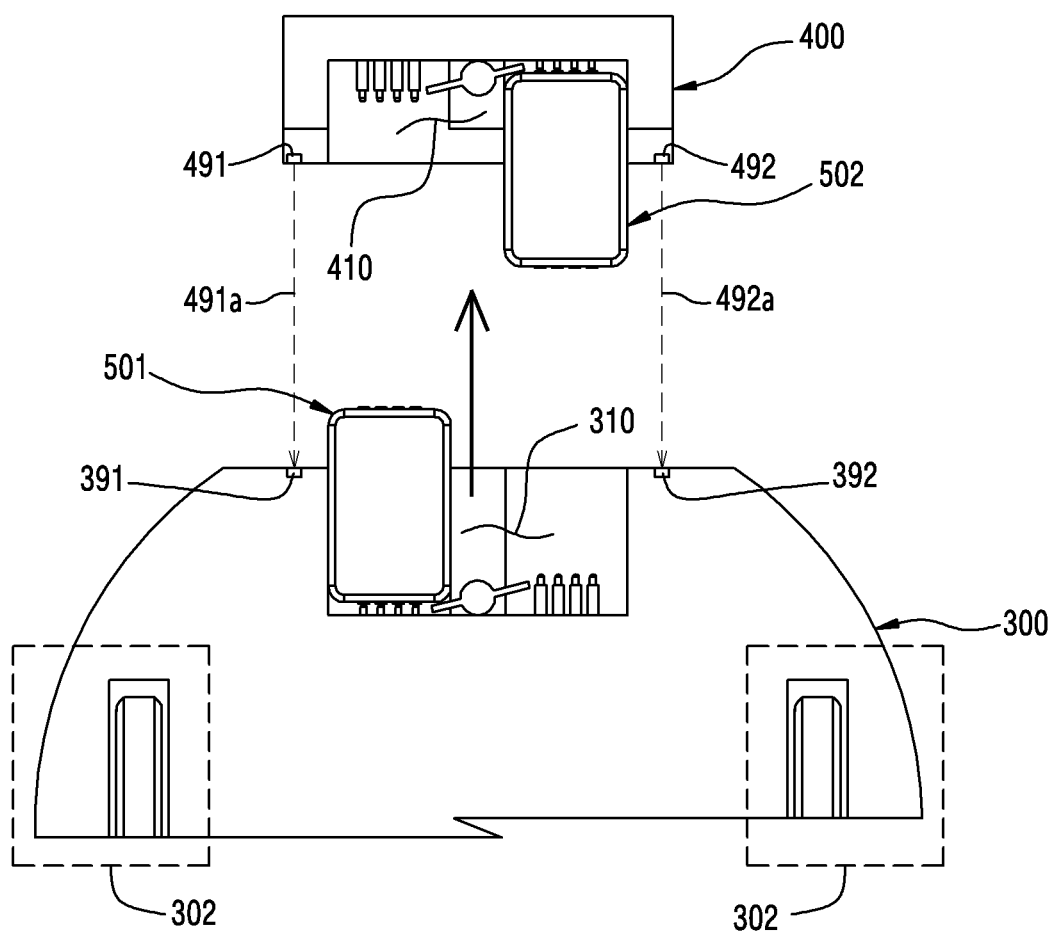
FIGS. 12, 13, and 14 are views to explain the operation flow of FIG. 11 according to an embodiment.
Figure 13:
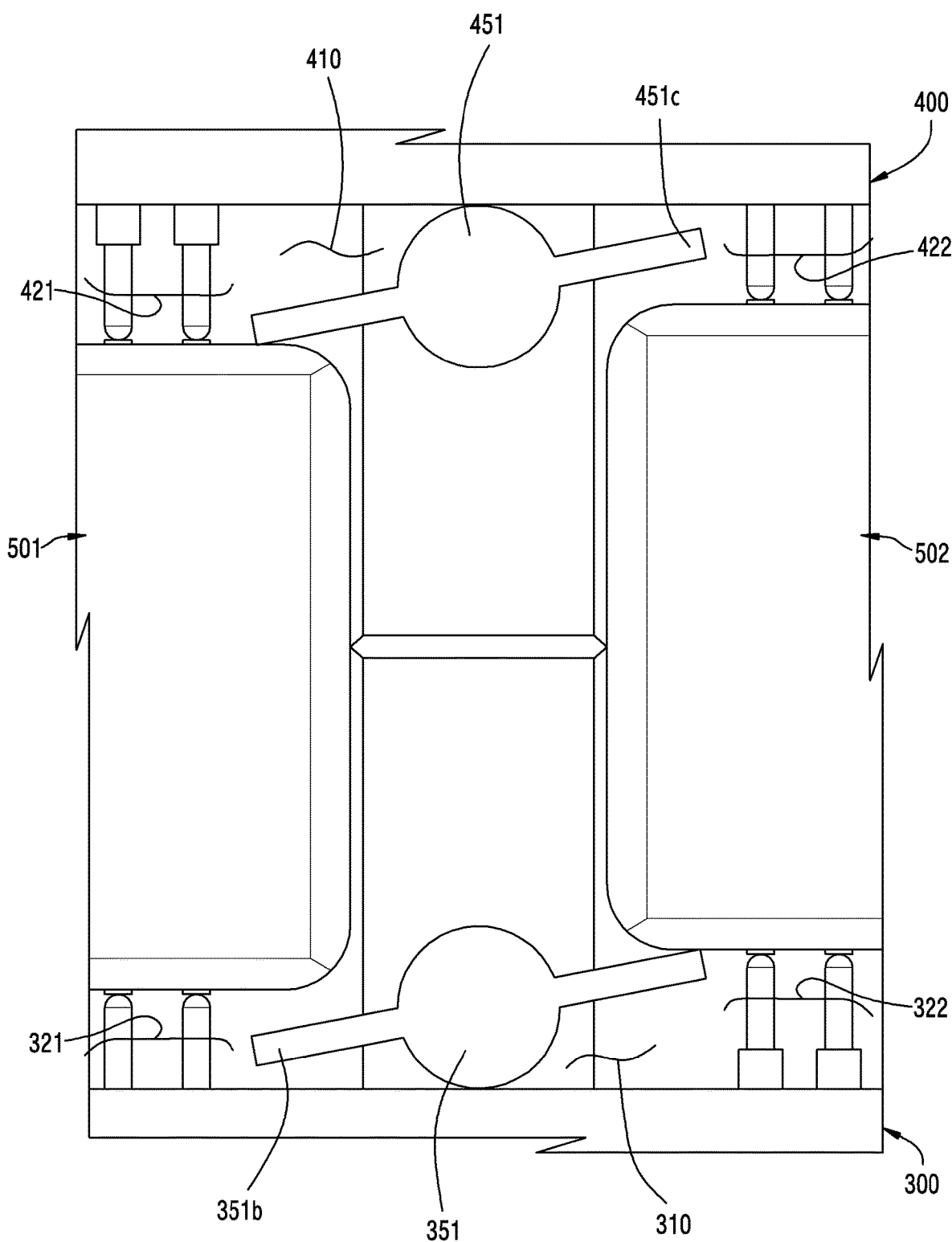
Figure 14:
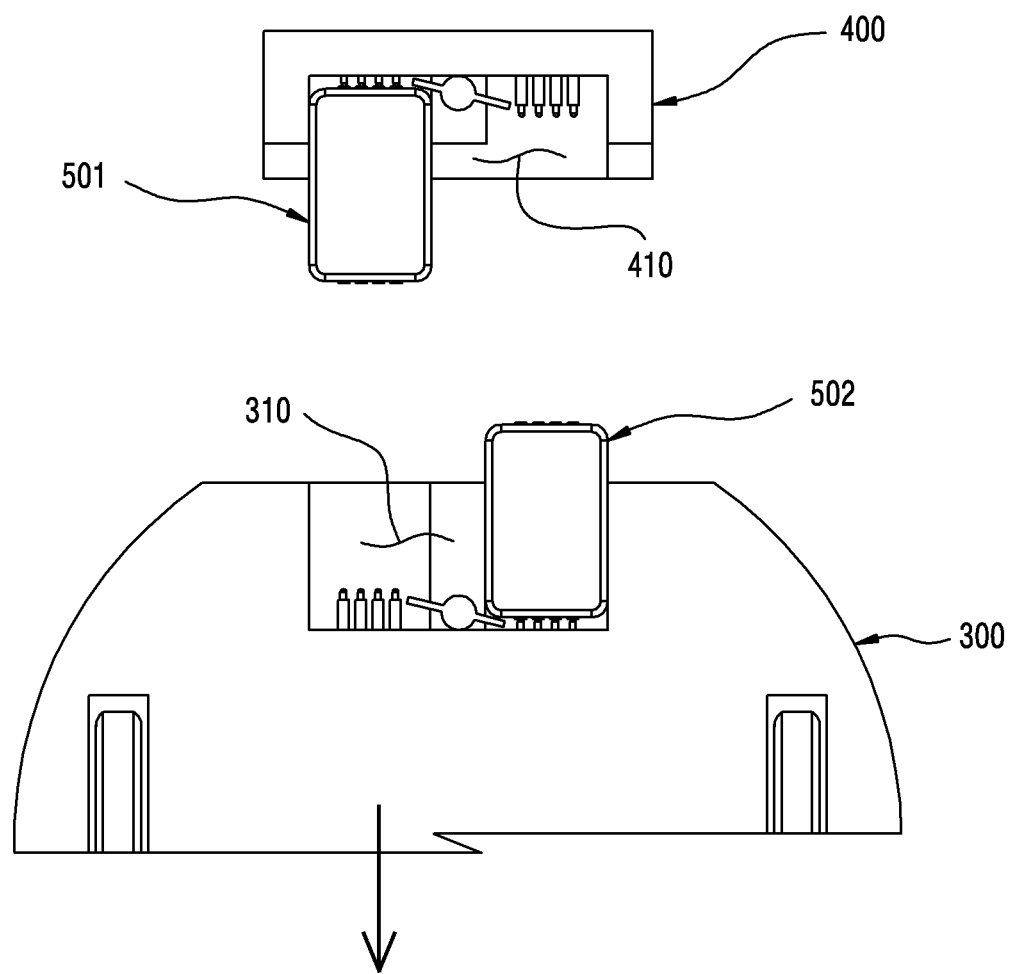

FIG. 11 illustrates an operation flow regarding battery replacement in an electronic device according to an embodiment. FIGS. 12, 13, and 14 are views to explain the operation flow of FIG. 11 according to an embodiment.

Referring to FIGS. 11 and 12, in operation 1101, the processor (for example, the processor 1010 of FIG. 10) of the electronic device 300 (for example, the electronic device 1000 of FIG. 10) may identify whether a remaining capacity of the first battery 501 disposed in the first battery mounting portion 310 is less than or equal to a threshold value. When it is identified that the remaining capacity of the first battery 501 is less than or equal to the threshold value, the processor of the electronic device 300 may perform operation 1103.

According to an embodiment, in operation 1103, the processor of the electronic device 300 may control the driving unit 302 (for example, the driving unit 1060 of FIG. 10) to move the electronic device 300 to the battery charging device 400, based on map information (for example, the map information 1031 of FIG. 10).

According to an embodiment, in operation 1105, the processor of the electronic device 300 may identify whether the electronic device 300 is positioned in the proximity of the battery charging device 400. For example, the processor of the electronic device 300 may identify whether the electronic device 300 is positioned within a set distance from the battery charging device 400, based on data acquired through a sensor module (for example, the sensor module 176 of FIG. 1) such as a proximity sensor, or a camera module (for example, the camera module 180 of FIG. 1). When it is identified that the electronic device 300 is positioned in the proximity of the battery charging device 400, the processor of the electronic device 300 may perform operation 1107.

According to an embodiment, in operation 1107, the processor of the electronic device 300 may control alignment and approach with respect to the battery charging device 400. For example, the electronic device 300 may include the first sensor 391 and the second sensor 392 which are disposed on both sides with reference to the first battery mounting portion 310. The battery charging device 400 may include the first light source 491 and the second light source 492 which are disposed on both sides with reference to the second battery mounting portion 410. The electronic device 300 moving in the proximity of the battery charging device 400 may approach the battery charging device 400 when light of a set frequency range is detected from all of the first sensor 391 and the second sensor 392. When the first sensor 391 is aligned facing the first light source 491 and the second sensor 392 is aligned facing the second light source 492, light of the set frequency range 491a, 492b may be detected from all of the first sensor 391 and the second sensor 392, and the first battery mounting portion 310 may be aligned, facing the second battery mounting portion 410. The electronic device 300 may control the driving unit 302 to detect the light of the set frequency range from all of the first sensor 391 and the second sensor 392.

According to an embodiment, in operation 1109, the processor of the electronic device 300 may identify whether the second battery 502 is electrically connected. Referring to FIGS. 12 and 13, when the first battery mounting portion 310 moves from the first position to the second position with respect to the second battery mounting portion 410, the second battery 502 disposed in the second battery mounting portion 410 may be inserted into the first battery mounting portion 310 and may come into contact with the at least one second terminal 322. When the second battery 502 comes into contact with the at least one second terminal 322, the processor of the electronic device 300 may detect that the second battery 502 is electrically connected with the electronic device 300. According to various embodiments, when the first battery mounting portion 310 moves from the first position to the second position with respect to the second battery mounting portion 410, the second battery 502 disposed in the second battery mounting portion 410 may rotate the first lever 351. When a rotation angle of the first lever 351 reaches a threshold value, the processor may recognize that the second battery 502 is electrically connected with the electronic device 300.

According to an embodiment, in operation 1111, the processor of the electronic device 300 may control the electronic device 300 to move (or change) a power source of the electronic device 300 from the first battery 501 to the second battery 502. Referring to FIG. 13, while the electronic device 300 and the battery charging device 400 are interacting with each other regarding battery replacement, the at least one first terminal 321 may be electrically connected with one surface of the first battery 501, and the at least one third terminal 421 may be electrically connected with the other surface of the first battery 501. While the electronic device 300 and the battery charging device 400 are interacting with each other regarding battery replacement, the at least one second terminal 322 may be electrically connected with one surface of the second battery 502, and the at least one fourth terminal 422 may be electrically connected with the other surface of the second battery 502. In a state where the electronic device is electrically connected with the first battery 501 through the at least one first terminal 321 and is electrically connected with the second battery 502 through the at least one second terminal 322, the processor of the electronic device 300 may control at least one switch circuit (for example, a transistor) to move the power source from the first battery 501 to the second battery 502. The electronic device 300 may change a flow of a current from the first battery 501 to the second battery 502 without turning off the power source.

According to an embodiment, in operation 1113, the processor of the electronic device 300 may control the electronic device 300 to transfer the first battery 501 to the battery charging device 400. Referring to FIG. 13, the processor of the electronic device 300 may rotate the first lever 351, and the first battery 501 may be transferred to the second battery mounting portion 410 of the battery charging device 400 by the first extension portion 351b of the first lever 351. For example, the first battery 501 may be moved by rotation of the first lever 351. When the first battery 501 is moved, coupling between the first groove (for example, the first groove 830 of FIG. 8A or 8B) of the first battery 501 and the first protrusion (for example, the first protrusion 311a of FIG. 3) of the first battery mounting portion 310 may be released, and coupling between the second groove (for example, the second groove 840 of FIG. 8A or 8B) of the first battery 501 and the third protrusion (for example, the third protrusion 411a of FIG. 6) of the second battery mounting portion 410 may be achieved. According to an embodiment, substantially at the same time, the battery charging device 400 may rotate the second lever 451, and the second battery 502 may be transferred to the first battery mounting portion 310 of the electronic device 300 by the second extension portion 451c of the second lever 451. For example, the second battery 502 may be moved by rotation of the second lever 451. When the second battery 502 is moved, coupling between the second groove (for example, the second groove 840 of FIG. 8A or 8B) of the second battery 502 and the fourth protrusion (for example, the fourth protrusion 412a of FIG. 6) of the second battery mounting portion 410 may be released, and coupling between the first groove (for example, the first groove 830 of FIG. 8A or 8B) of the second battery 502, and the second protrusion (for example, the second protrusion 312a of FIG. 3) of the first battery mounting portion 310 may be achieved.

According to an embodiment, in operation 1115, the processor of the electronic device 300 may control the driving unit 302 (for example, the driving unit 1060 of FIG. 10) to separate the electronic device 300 from the battery charging device 400 (see FIG. 14). According to various embodiments, operations 1113 and 1115 may be performed substantially at the same time. For example, the electronic device 300 may rotate the first lever 351 while being moved to be separated from the battery charging device 400. The battery charging device 400 may charge the first battery 501 transferred from the electronic device 300 by using a power source.

According to various embodiments, the electronic device 300 may perform substantially the same operation flow as in FIG. 11, regarding replacement of the second battery 502 disposed in the first battery mounting portion 310 of the electronic device 300 and the first battery 501 disposed in the second battery mounting portion 410 of the battery charging device 400, and a detailed description thereof is omitted.

Figure 15:
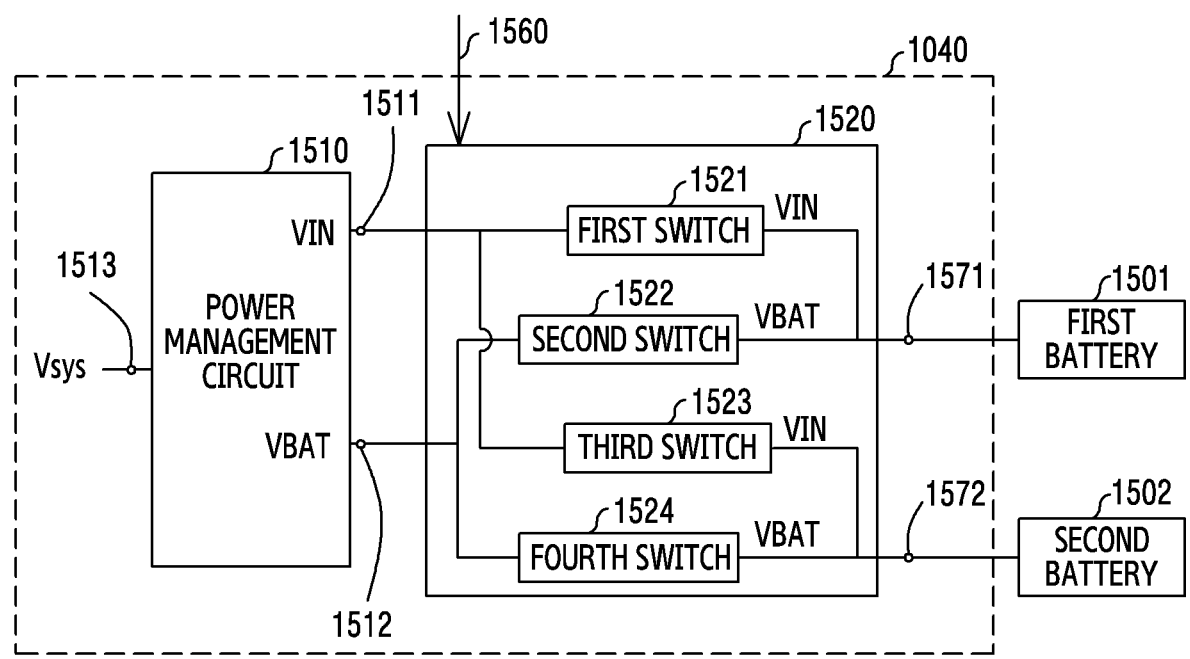
FIG. 15 is a block diagram of a power source circuit of FIG. 10 according to an embodiment.

FIG. 15 is a block diagram of the power circuit 1040 of FIG. 10 according to an embodiment.

Referring to FIG. 15, the power circuit 1040 in an embodiment may include a power management circuit 1510 or a switch circuit 1520.

According to an embodiment, the power management circuit 1510 (for example, the power management module 188 of FIG. 1) may manage power supplied to the electronic device (for example, the electronic device 1000 of FIG. 10). The power management circuit 1510 may be implemented by a portion of a power management integrated circuit (PMIC), for example. According to various embodiments, the power management circuit 1510 may include a charging circuit (for example, a charging IC).

According to an embodiment, the switch circuit 1520 may be provided between at least one first terminal 1571 (for example, the at least one terminal 321 of FIG. 13) and the power management circuit 1510, and between at least one second terminal 1572 (for example, the at least one second terminal 322 of FIG. 13) and the power management circuit 1510.

According to an embodiment, the power management circuit 1510 may include a VIN terminal 1511 to receive external power (or external voltage) as a power source (or a voltage source). The power management circuit 1510 may include a VBAT terminal 1512 to receive battery power (or battery voltage) as a power source (or a voltage source). The power management circuit 1510 may include a VSYS terminal 1513 related to a system input power source.

According to an embodiment, when a battery is connected through the VBAT terminal 1512, at least a portion of power provided from the battery may be utilized as the system input power source through the VSYS terminal 1513.

According to an embodiment, when an external power source is connected through the VIN terminal 1511, at least a portion of power provided from the external power source may be utilized as the system input power source through the VSYS terminal 1513. According to various embodiments, when an external power source is connected through the VIN terminal 1511, a portion of power provided from the external power source may be provided to the battery through the VBAT terminal 1512 (for example, battery charging). For example, when an external power source is connected through the VIN terminal 1511, power provided from the external power source may be divided into the VSYS terminal 1513 and the VBAT terminal 1512.

According to an embodiment, the switch circuit 1520 may include a first switch 1521 which is disposed on an electric path between the at least one first terminal 1571 and the VIN terminal 1511, and a second switch 1522 which is disposed on an electric path between the at least one terminal 1571 and the VBAT terminal 1512. According to an embodiment, the switch circuit 1520 may include a third switch 1523 which is disposed on an electric path between the at least one second terminal 1572 and the VIN terminal 1512, and a fourth switch 1524 which is disposed on an electric path between the at least one second terminal 1572 and the VBAT terminal 1512.

According to an embodiment, the power management circuit 1510 or the processor 1010 of FIG. 10 may detect whether a first battery 1501 is electrically connected with the electronic device (for example, the electronic device 1000 of FIG. 10) through the VIN terminal 1511 when the first switch 1521 is in an on-state. According to an embodiment, the power management circuit 1510 or the processor of FIG. 10 may detect whether a second battery 1502 is electrically connected with the electronic device through the VIN terminal 1511 when the third switch 1523 is in an on-state.

In an embodiment, referring to FIGS. 13 and 15, while the electronic device 300 and the battery charging device 400 are interacting with each other for battery replacement, the at least one first terminal 1571 (for example, the at least one first terminal 321 of FIG. 13) may be electrically connected with the first battery 1501 (for example, the first battery 501 of FIG. 13), and the at least one second terminal 1572 (for example, the at least one second terminal 322 of FIG. 13) may be electrically connected with the second battery 1502 (for example, the second battery 502 of FIG. 13). According to an embodiment, the switch circuit 1520 may control an on/off state of the first switch 1521, the second switch 1522, the third switch 1523, and/or the fourth switch 1524 according to a signal 1560 from the power management circuit 1510 or the processor (for example, the processor 1010 of FIG. 10), to move (change) the system input power source outputted through the VSYS terminal 1513 from the first battery 1501 to the second battery 1502, or to move from the second battery 1502 to the first battery 1501.

Figure 16:
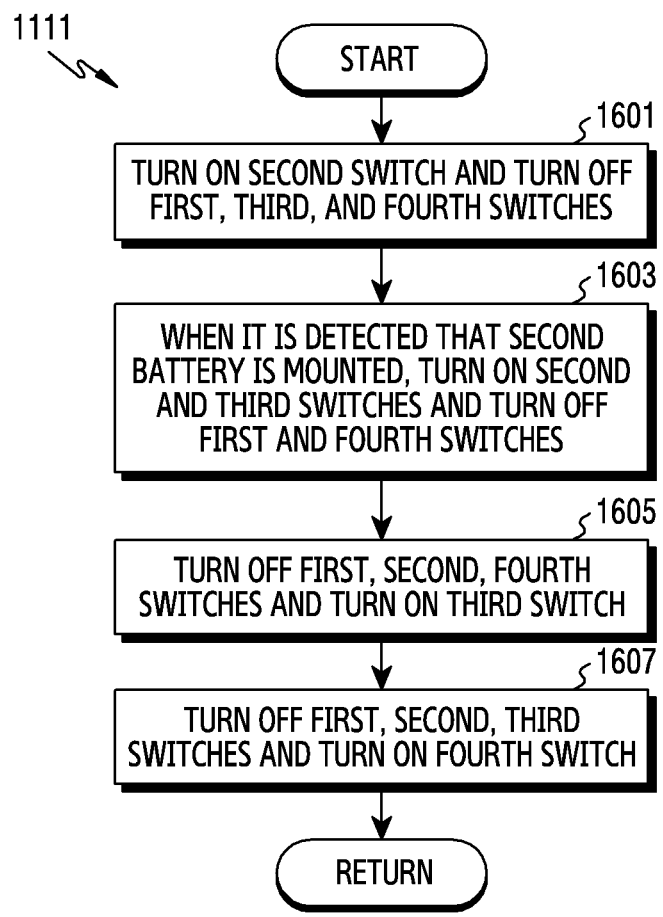
FIG. 16 is a view illustrating an operation flow of moving a power source from a first battery to a second battery when an electronic device according to an embodiment transfers the first battery to a battery charging device and receives the second battery from the battery charging device, which is related to operation 1111 of FIG. 11.
Figure 17A:
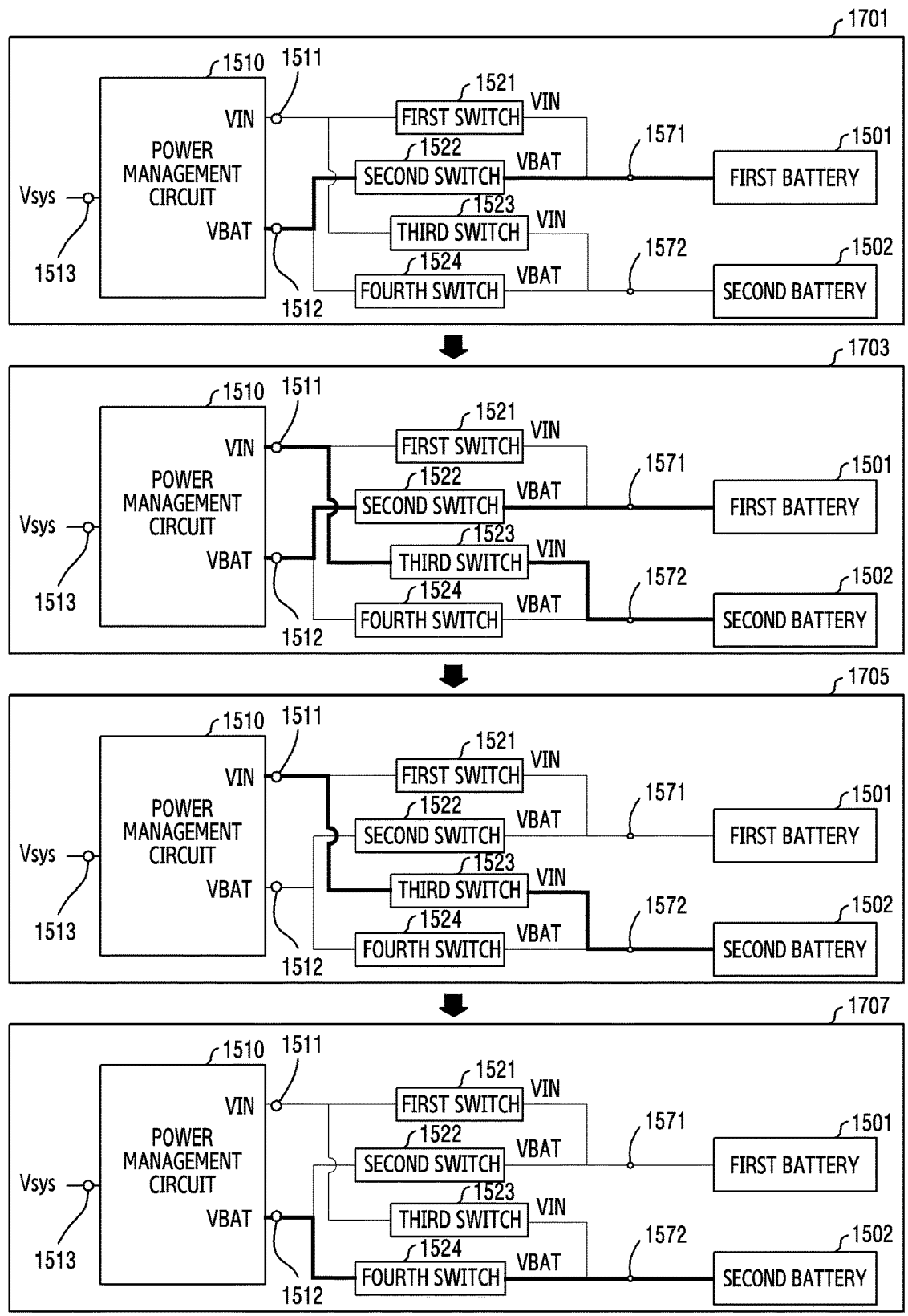
FIG. 17A is a view illustrating the operation flow of FIG. 16 according to an embodiment.
Figure 17B:
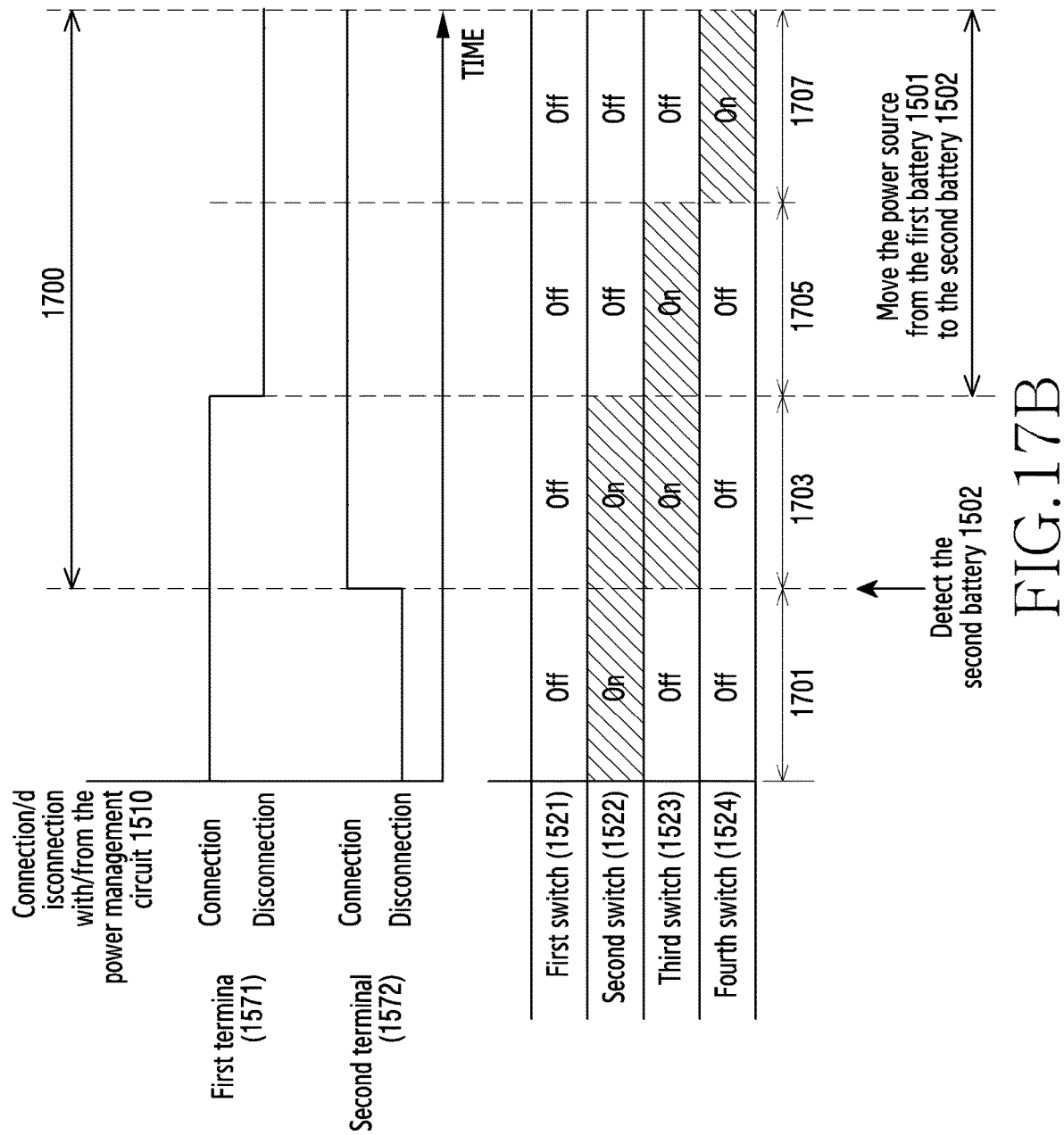
FIG. 17B is a view illustrating a circuit state in relation to the operation flow of FIG. 16 according to an embodiment.

FIG. 16 illustrates an operation flow of moving the power source from the first battery to the second battery when the electronic device according to an embodiment transfers the first battery to a battery charging device (for example, the battery charging device 400 of FIG. 2A or 2B) and receives the second battery from the battery charging device, which is related to operation 1111 of FIG. 11. FIG. 17A is a view to explain the operation flow of FIG. 16 according to an embodiment. FIG. 17B illustrates a circuit state in relation to the operation flow of FIG. 16 according to an embodiment.

Referring to FIGS. 17A and 17B, in an embodiment, the operation of moving (changing) the system input power source Vsys from the first battery 1501 to the second battery 1502 may be implemented in a period 1700 during which the first battery 1501 is electrically connected with the power management circuit 1510 through the at least one first terminal 1571, and the second battery 1502 is electrically connected with the power management circuit 1510 through the at least one second terminal 1572.

Referring to FIG. 16, and a period 1701 of FIG. 17A or 17B, in operation 1601, the processor (for example, the processor 1010 of FIG. 10) may turn on the second switch 1522 and may turn off the first, third, and fourth switches 1521, 1523, 1524. In the period 1701, the processor may maintain the second switch 1522 in the on-state, and may utilize power from the first battery 1501 as the system input power source Vsys.

Referring to FIG. 16 and a period 1703 of FIG. 17A or 17B, in operation 1603, when it is detected that the second battery 1502 is mounted in the electronic device, the processor (for example, the processor 1010 of FIG. 10) may turn on the second and third switches 1522, 1523 and may turn off the first and fourth switches 1521, 1524. In an embodiment, referring to FIG. 13, when the first battery mounting portion 310 moves from the first position to the second position with respect to the second battery mounting portion 410, the second battery 502 disposed in the second battery mounting portion 410 may rotate the first lever 351. The processor may detect that the second battery 502 is mounted in the first battery mounting portion 310 when a rotation angle of the first lever 351 reaches a threshold value. According to an embodiment, the processor may turn on the third switch 1523 and may detect, through the VIN terminal 1511, that the second battery 1502 is electrically connected with the power management circuit 1510 through the at least one second terminal 1572. For example, when a voltage is applied through the VIN terminal 1511, the processor may identify that the second battery 502 mounted in the first mounting portion 310 is electrically connected with the power management circuit 1510. When it is detected that the second battery 1502 is electrically connected with the power management circuit 1510, the processor may perform operation 1605.

Referring to FIG. 16 and a period 1705 of FIG. 17A or 17B, in operation 1605, the processor (for example, the processor 1010 of FIG. 10) may turn off the first, second, and fourth switches 1521, 1522, 1524, and may turn on the third switch 1523. In the period 1705, the processor may turn off the second switch 1522 and may electrically disconnect the at least one first terminal 1571 and the VBAT terminal 1512 of the power management circuit 1510 from each other. In the period 1705, the processor may turn on the third switch 1523 and may electrically connect the at least one second terminal 1572 and the VIN terminal 1511 of the power management circuit 1510. In the period 1705, power from the second battery 1502 which is inputted through the VIN terminal 1511 may be utilized as the system input power source Vsys. For example, a charging IC which is included in the power management circuit 1510 or is electrically connected with the power management circuit 1510 may receive power from the second battery 1502 through the VIN terminal 1511, and may supply the power to the system input power source Vsys.

Referring to FIG. 16 and a period 1707 of FIG. 17A or 17B, in operation 1607, the processor (for example, the processor 1010 of FIG. 10) may turn off the first, second and third switches 1521, 1522, 1523 and may turn on the fourth switch 1524. According to an embodiment, when the period 1705 switches to the period 1707, the third switch 1523 may be turned off and the fourth switch 1524 may be turned on, simultaneously, such that an electric connection between the second battery 1502 and the power management circuit 1510 can be maintained without disconnection. In the period 1707, the processor may turn off the third switch 1523 and may electrically disconnect the at least one second terminal 1572 and the VIN terminal 1511 of the power management circuit 1510. In the period 1707, the processor may turn on the fourth switch 1524 and may electrically connect the at least one second terminal 1572 and the VBAT terminal 1512 of the power management circuit 1510. In the period 1707, power from the second battery 1502 which is inputted through the VBT terminal 1512 may be utilized as the system input power source Vsys.

According to an embodiment, the switches 1521, 1522, 1523, 1524 and control thereof suggested in FIG. 17A or 17B may prevent the first battery 1501 and the second battery 1502 which has a remaining capacity greater than the first battery 1501 or is fully charged from being directly connected with each other, and may prevent the first battery 1501 from being charged by the second battery 1502.

Figure 18:
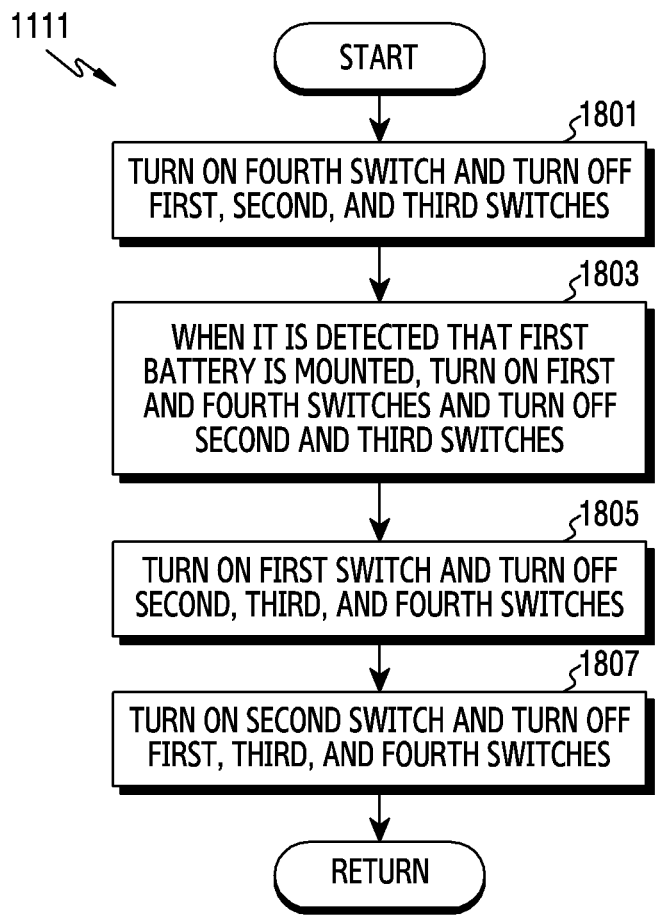
FIG. 18 is a view illustrating an operation flow of moving a power source from a second battery to a first battery when an electronic device according to an embodiment transfers the second battery to a battery charging device and receives the first battery from the battery charging device, which is related to operation 1111 of FIG. 11.
Figure 19A:
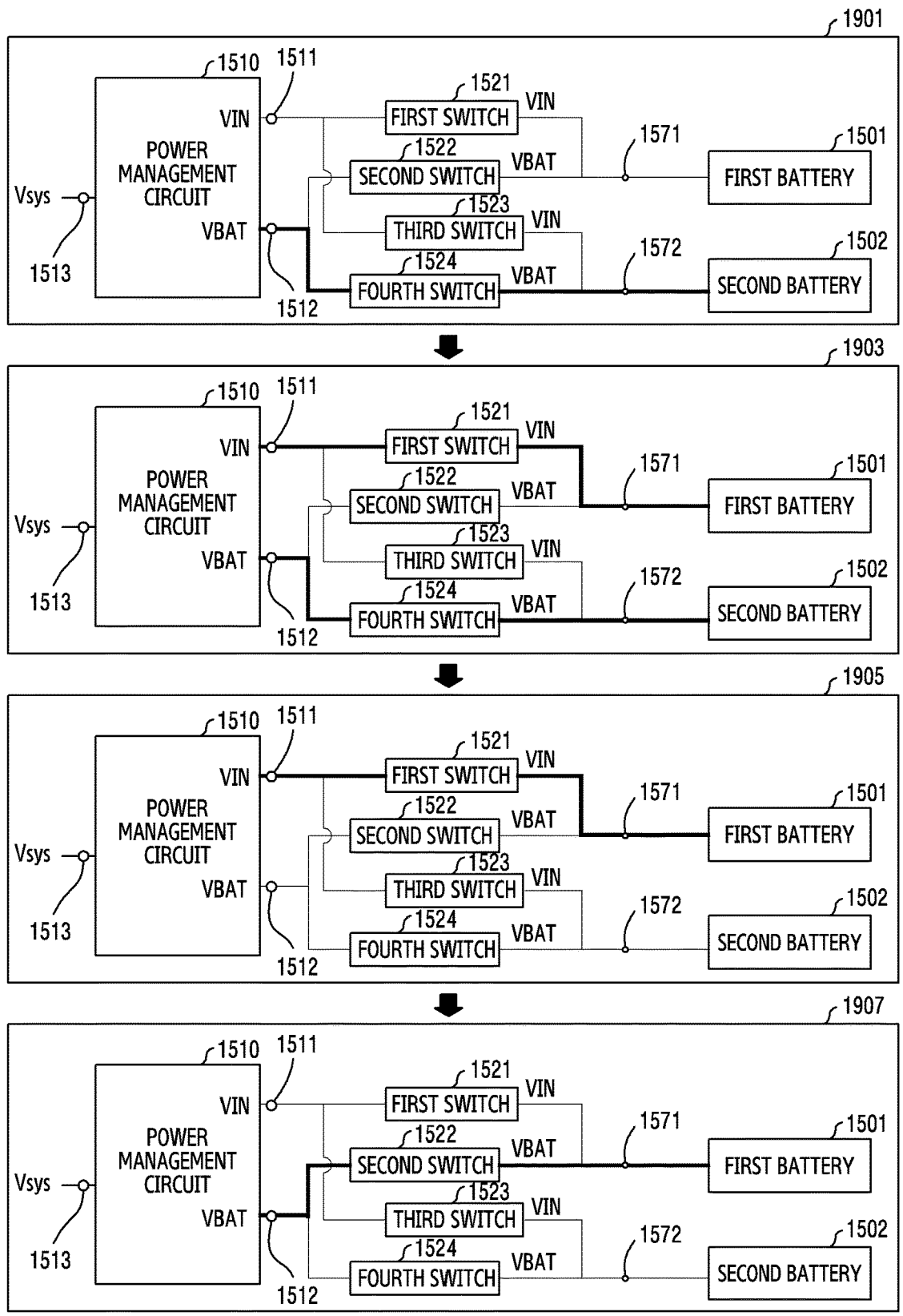
FIG. 19A is a view illustrating the operation flow of FIG. 18 according to an embodiment.

FIG. 18 illustrates an operation flow of moving the power source from the second battery to the first battery when the electronic device according to an embodiment transfers the second battery to the battery charging device (for example, the battery charging device 400 of FIG. 2A or 2B) and receives the first battery from the battery charging device, which is related to operation 1111 of FIG. 11. FIG. 19A is a view to explain the operation flow of FIG. 18 according to an embodiment. FIG. 19B is a view illustrating a circuit state in relation to the operation flow of FIG. 18 according to an embodiment.

Referring to FIGS. 19A and 19B, in an embodiment, the operation of moving (or changing) the system input power source Vsys from the second battery 1502 to the first battery 1501 may be implemented in a period 1900 during which the first battery 1501 is electrically connected with the power management circuit 1510 through the at least one first terminal 1571, and the second battery 1502 is electrically connected with the power management circuit 1510 through the at least one second terminal 1572.

Referring to FIG. 18 and a period 1901 of FIG. 19A or 19B, in operation 1801, the processor (for example, the processor 1010 of FIG. 10) may turn on the fourth switch 1524 from among the first to fourth switches 1521, 1522, 1523, 1524. In the period 1901, the processor may maintain the fourth switch 1524 in the on-state and may utilize power from the second battery 1502 as the system input power source Vsys.

Referring to FIG. 18 and a period 1903 of FIGS. 19A and 19B, in operation 1803, the processor (for example, the processor 1010 of FIG. 10) may turn on the first and fourth switches 1521, 1524 and may turn off the second and third switches 1522, 1523 when it is detected that the first battery 1501 is mounted in the electronic device. In an embodiment, referring to FIG. 13, when the first battery mounting portion 310 moves from the first position to the second position with respect to the second battery mounting portion 410, the first battery 501 disposed in the second battery mounting portion 410 may rotate the first lever 351. The processor may detect that the first battery 501 is mounted in the first battery mounting portion 310 when a rotation angle of the first lever 351 reaches a threshold value. According to an embodiment, the processor may turn on the first switch 1521 and may detect, through the VIN terminal 1511, that the first battery 1501 is electrically connected with the power management circuit 1510 through the at least one first terminal 1571. For example, when a voltage is applied through the VIN terminal 1511, the processor may identify that the first battery 501 mounted in the first mounting portion 310 is electrically connected with the power management circuit 1510. When it is detected that the first battery 1501 is electrically connected with the power management circuit 1510, the processor may perform operation 1805.

Referring to FIG. 18 and a period 1905 of FIG. 19A or 19B, in operation 1805, the processor (for example, the processor 1010 of FIG. 10) may turn off the second, third, and fourth switches 1522, 1523, 1524 and may turn on the first switch 1521. In the period 1905, the processor may turn off the fourth switch 1524 and may electrically disconnect the at least one second terminal 1572 and the VBAT terminal 1512 of the power management circuit 1510. In the period 1905, the processor may turn on the first switch 1521 and may electrically connect the at least one first terminal 1571 and the VIN terminal 1511 of the power management circuit 1510. In the period 1905, power from the first battery 1501 which is inputted through the VIN terminal 1511 may be utilized as the system input power source Vsys. For example, the charging IC which is included in the power management circuit 1510 or is electrically connected with the power management circuit 1510 may receive power from the first battery 1501 through the VIN terminal 1511, and may supply the power to the system input power source Vsys.

Referring to FIG. 18 and a period 1907 of FIG. 19A or 19B, in operation 1807, the processor (for example, the processor 1010 of FIG. 10) may turn off the first, third, and fourth switches 1521, 1523, 1524 and may turn on the second switch 1522. According to an embodiment, when the period 1905 switches to the period 1907, the first switch 1521 may be turned off and the second switch 1522 may be turned on substantially at the same time, such that an electric connection between the first battery 1501 and the power management circuit 1510 can be maintained without disconnection. In the period 1907, the processor may turn off the first switch 1521 and may electrically disconnect the at least one first terminal 1571 and the VIN terminal 1511 of the power management circuit 1510. In the period 1907, the processor may turn on the second switch 1522 and may electrically connect the at least one first terminal 1571 and the VBAT terminal 1512 of the power management circuit 1510. In the period 1907, power from the first battery 1501 which is inputted through the VBT terminal 1512 may be utilized as the system input power source Vsys.

According to an embodiment, the switches 1521, 1522, 1523, 1524 and control thereof suggested in FIG. 19A or 19B may prevent the second battery 1502 and the first battery 1501 which has a remaining capacity greater than the second battery 1502 or is fully charged from being directly connected with each other, and may prevent the second battery 1502 from being charged by the first battery 1501.

Figure 20:
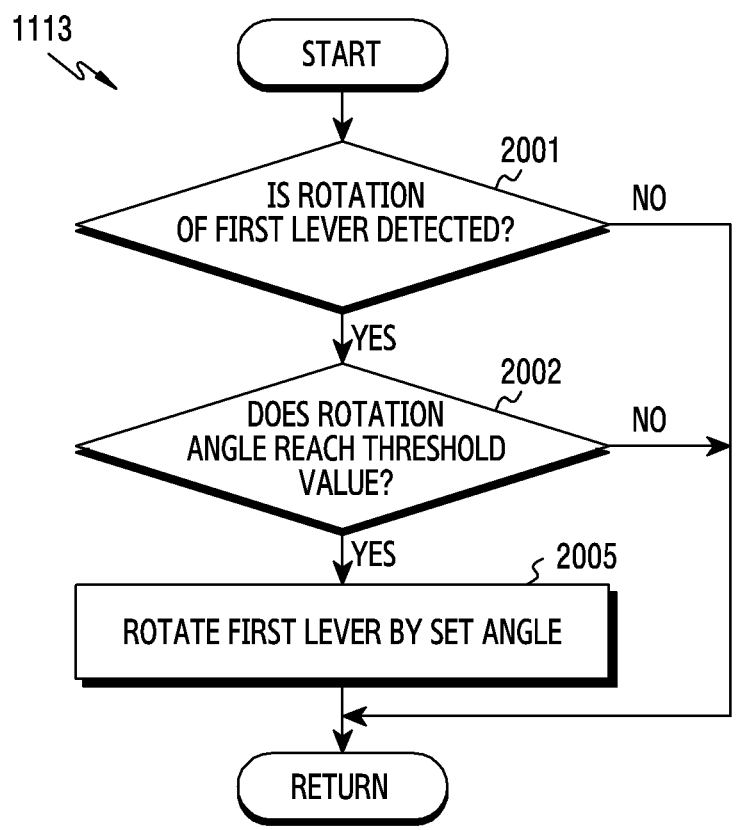
FIG. 20 is a view illustrating an operation flow of an electronic device separating a battery according to an embodiment, which is related to operation 1113 of FIG. 11.
Figure 21:
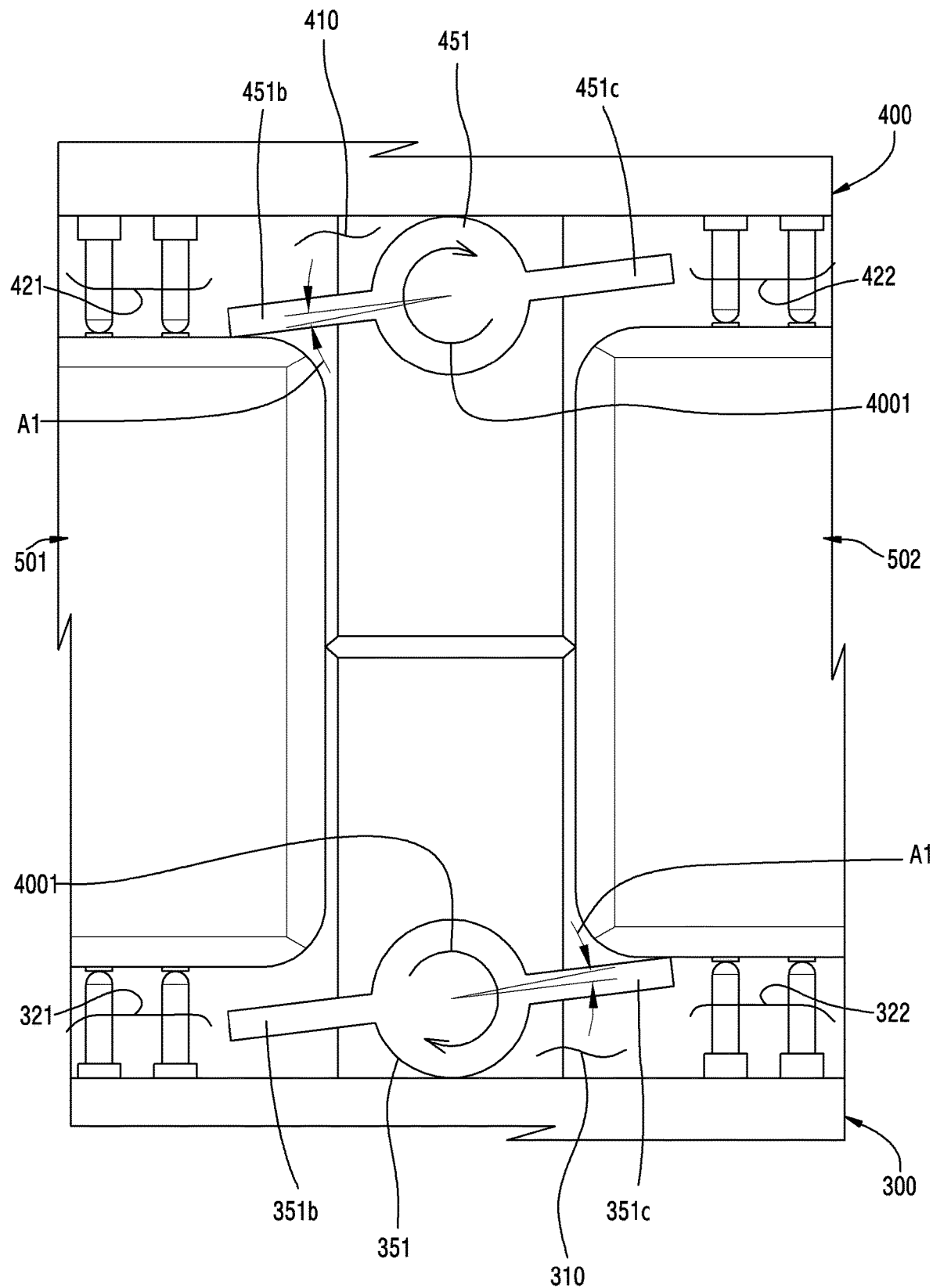
FIGS. 21 and 22 are views illustrating a state when an electronic device transfers a first battery to a battery charging device and receives a second battery from the battery charging device according to an embodiment.
Figure 22:
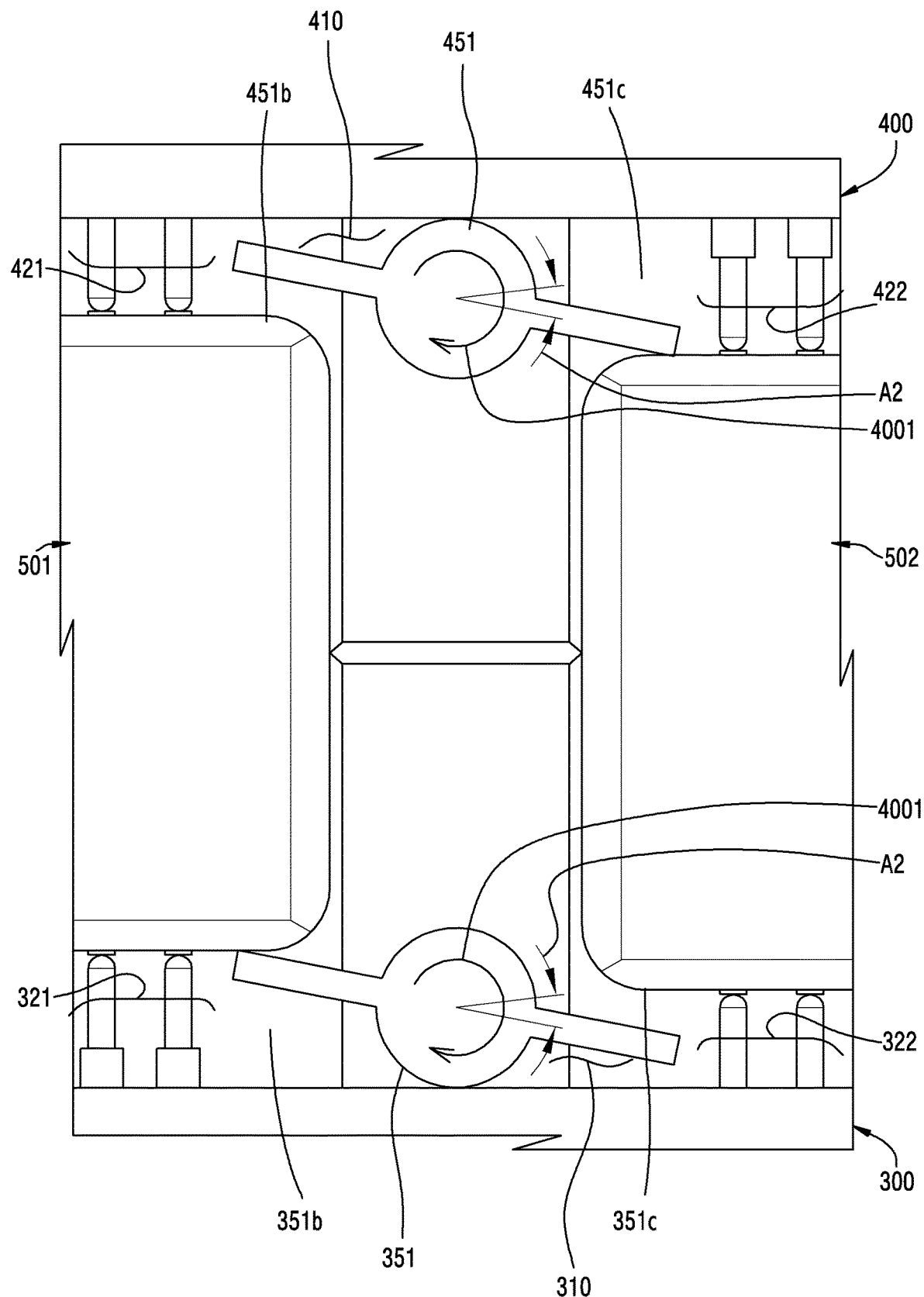

FIG. 20 illustrates an operation flow of the electronic device according to an embodiment separating a battery in relation to operation 1113 of FIG. 11. FIGS. 21 and 22 illustrate a state when the electronic device transfers the first battery to the battery charging device and receives the second battery from the battery charging device according to an embodiment.

Referring to FIGS. 20 and 21, in operation 2001, the processor (for example, the processor 1010 of FIG. 10) of the electronic device 300 may identify whether the first lever 351 is rotated. When the rotation of the first lever 351 is detected, the processor may identify whether a rotation angle reaches a threshold value in operation 2003. For example, when the first battery mounting portion 310 approaches the second position from the first position with respect to the second battery mounting portion 410, the second battery 502 disposed in the second battery mounting portion 410 may be inserted into the first battery mounting portion 310 and may press the second extension portion 351c of the first lever 351, and the first lever 351 may be rotated by a set first angle A1 (for example, about 2°) in the first direction 4001. The second battery 502 may be inserted into the first battery mounting portion 310 and may come into contact with the at least one second terminal 322. According to an embodiment, the electronic device 300 may detect that the first lever 351 is rotated by the set first angle A1 in the first direction 4001 through at least one sensor (for example, the sensor 352 of FIG. 5).

According to an embodiment, when it is identified that the rotation angle reaches the threshold value in operation 2003, the processor may perform operation 2005. In operation 2005, the processor may rotate the first lever 351 by a set second angle (for example, about 12°). Referring to FIGS. 21 and 22, when it is detected that the first lever 351 is rotated by the set first angle A1 in the first direction 4001 by the second battery 502, the electronic device 300 may recognize that the second battery 502 is inserted into the first battery mounting portion 310, and may control the motor (for example, the motor 353 of FIG. 5) connected to the first lever 351 to rotate the first lever 351 in the set second angle A2 (for example, about 12°) in the first direction 4001. When the first lever 351 is rotated by the second angle A2 in the first direction 4001, the first battery 501 may be transferred to the second battery mounting portion 410 from the first battery mounting portion 310 by the first extension portion 351b of the first lever 351.

According to an embodiment, referring to FIGS. 21 and 22, when it is detected that the second lever 451 is rotated by the set first angle A1 (for example, about 2°) in a set direction, the battery charging device 400 may rotate the second lever 451 by the second angle A2 (for example, about 12°) and may transfer the second battery 502 to the first battery mounting portion 310 of the electronic device 300.

According to various embodiments (not shown), in the same way, the electronic deice 300 may transfer the second battery to the secondary battery mounting portion 410 of the battery charging device 400 from the first battery mounting portion 310 through the operation flow of FIG. 20.

Figure 23:
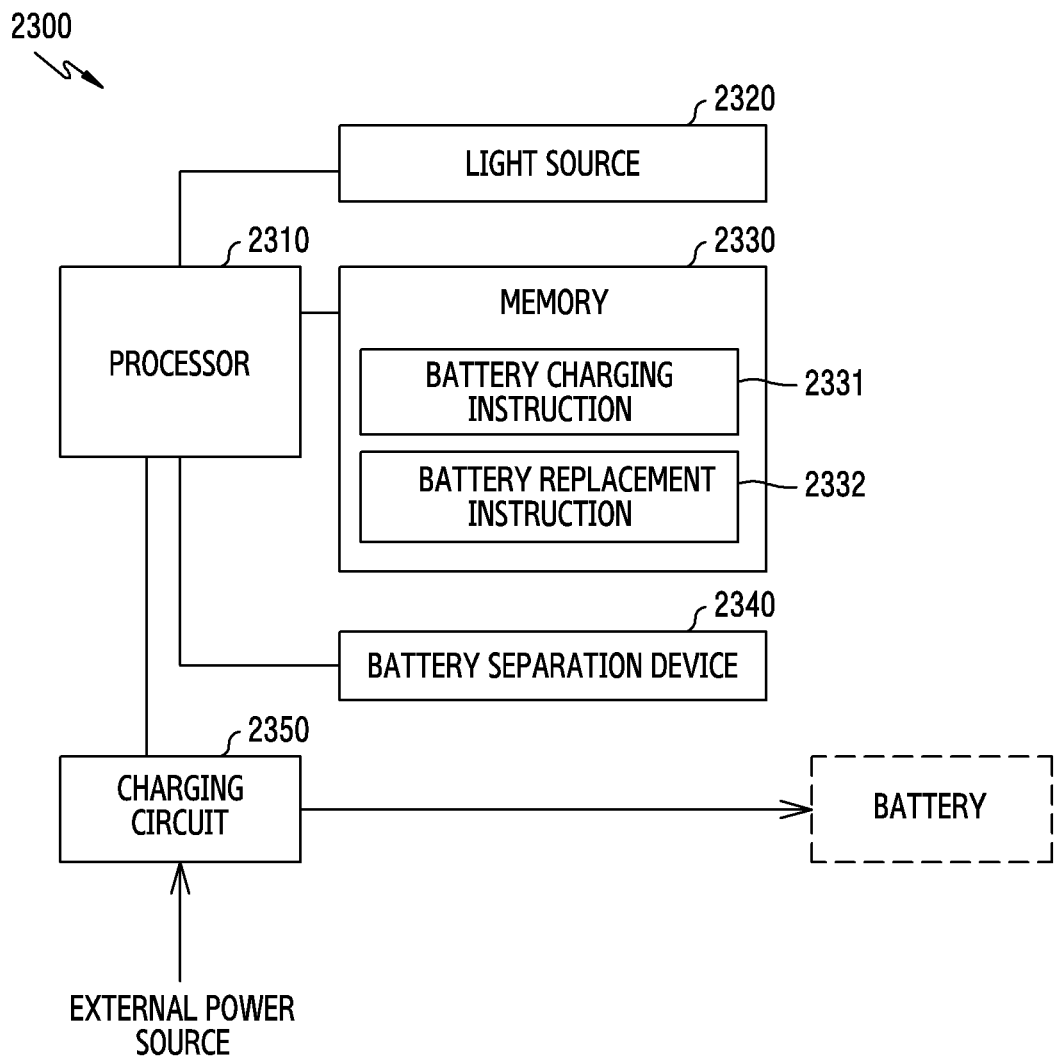
FIG. 23 is a block diagram of a battery charging device according to an embodiment.

FIG. 23 is a block diagram of a battery charging device according to an embodiment.

Referring to FIG. 23, the battery charging device 2300 (for example, the electronic device 400 of FIG. 2A or 2B) in an embodiment may include at least one of a processor 2310, a light source 2320, a memory 2330, a battery separation device 2340, or a charging circuit 2340.

The processor 2310 may perform various operations based on information or instructions included in the memory 2330. According to an embodiment, the memory 2330 may include a battery charging instruction 2331 or a battery replacement instruction 2332.

According to an embodiment, the battery charging instruction 2331 may include a routine that causes the processor 2310 to control the charging circuit 2350 to charge a battery disposed in the third slot 411 or the fourth slot 412 of the second battery mounting portion (for example, the second battery mounting portion 410 of FIG. 6) by using an external power source.

According to an embodiment, the battery replacement instruction 2332 may include a routine that causes the processor 2310 to control the battery separation device 2340 to transfer a battery to the electronic device (for example, the electronic device 300 of FIG. 2A or 2B, or the electronic device 1000 of FIG. 10). According to an embodiment, the battery separation device 2340 may be implemented substantially the same as the first separation device 350 of FIG. 5, and a detailed description thereof is omitted.

Figure 24:
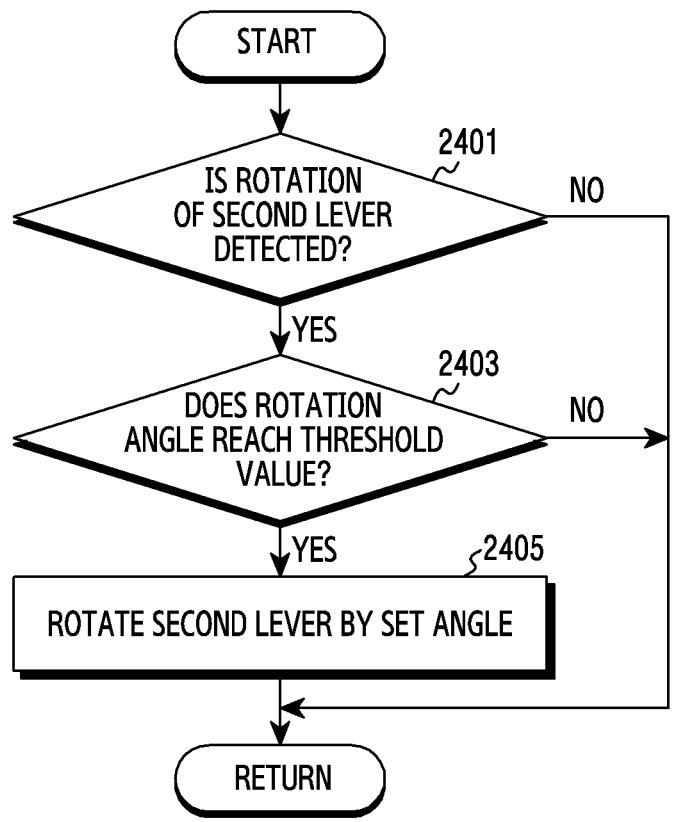
FIG. 24 is a view illustrating an operation flow of a battery charging device separating a battery according to an embodiment.

FIG. 24 illustrates an operation flow of the battery charging device separating a battery according to an embodiment. The operation flow of FIG. 24 will be described with reference to FIGS. 21 and 22.

According to an embodiment, in operation 2401, the processor (for example, the processor 2310 of FIG. 23) of the battery charging device 400 may identify whether the second lever 451 is rotated. When the rotation of the second lever 451 is detected, the processor may identify whether a rotation angle reaches a threshold value in operation 2403. For example, when the first battery mounting portion 310 approaches the second position from the first position with respect to the second battery mounting portion 410, the first battery 501 disposed in the first battery mounting portion 310 may be inserted into the second battery mounting portion 410 and may press the first extension portion 451b of the second lever 451, and the second lever 451 may be rotated by the set first angle A1 (for example, about 2°) in the first direction 4001. The first battery 501 may be inserted into the second battery mounting portion 410 and may come into contact with the at least one third terminal 421. According to an embodiment, the battery charging device 400 may detect, through at least one sensor (for example, the motor encoder), that the second lever 451 is rotated by the set first angle A1 in the first direction 4001.

According to an embodiment, when it is identified that the rotation angle reaches the threshold value in operation 2403, the processor may perform operation 2405. In operation 2405, the processor may rotate the second lever 451 by the set second angle (for example, about 12°). Referring to FIGS. 21 and 22, when it is detected that the second lever 451 is rotated by the set first angle A1 in the first direction 4001 by the first battery 501, the battery charging device 400 may recognize that the first battery 501 is inserted into the second battery mounting portion 410, and may control the motor connected to the second lever 451 to rotate the second lever 451 by the set second angle A2 (for example, about 12°) in the first direction 4001. When the second lever 451 is rotated by the second angle A2 in the first direction 4001, the second battery 502 may be transferred to the first battery mounting portion 310 from the second battery mounting portion 410 by the second extension portion 451c of the second lever 451.

Figure 25:
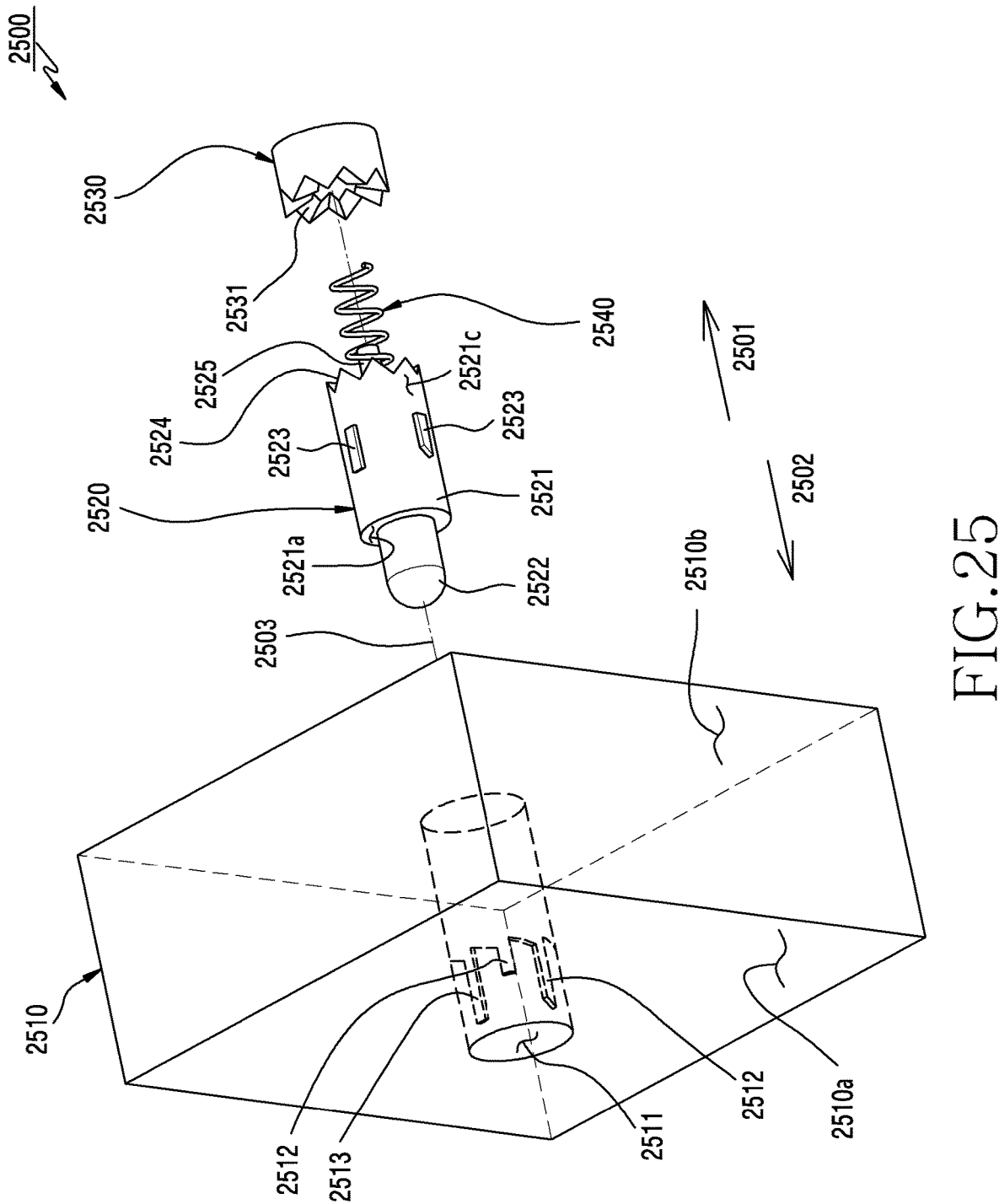
FIG. 25 is an exploded perspective view of a structure including a terminal according to various embodiments.
Figure 26:
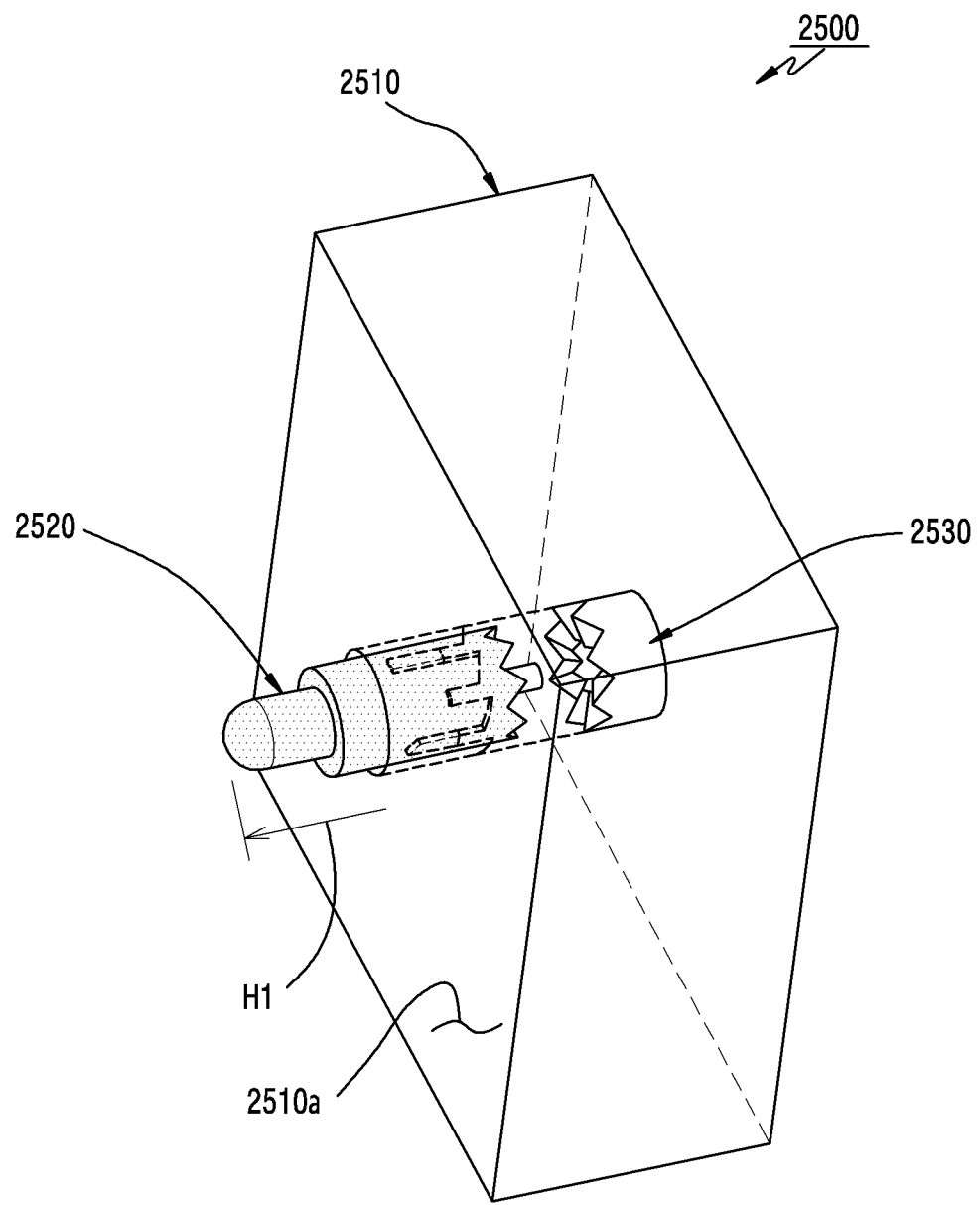
FIGS. 26 and 27 are views illustrating an operation state of the structure of FIG. 25 according to an embodiment.
Figure 27:
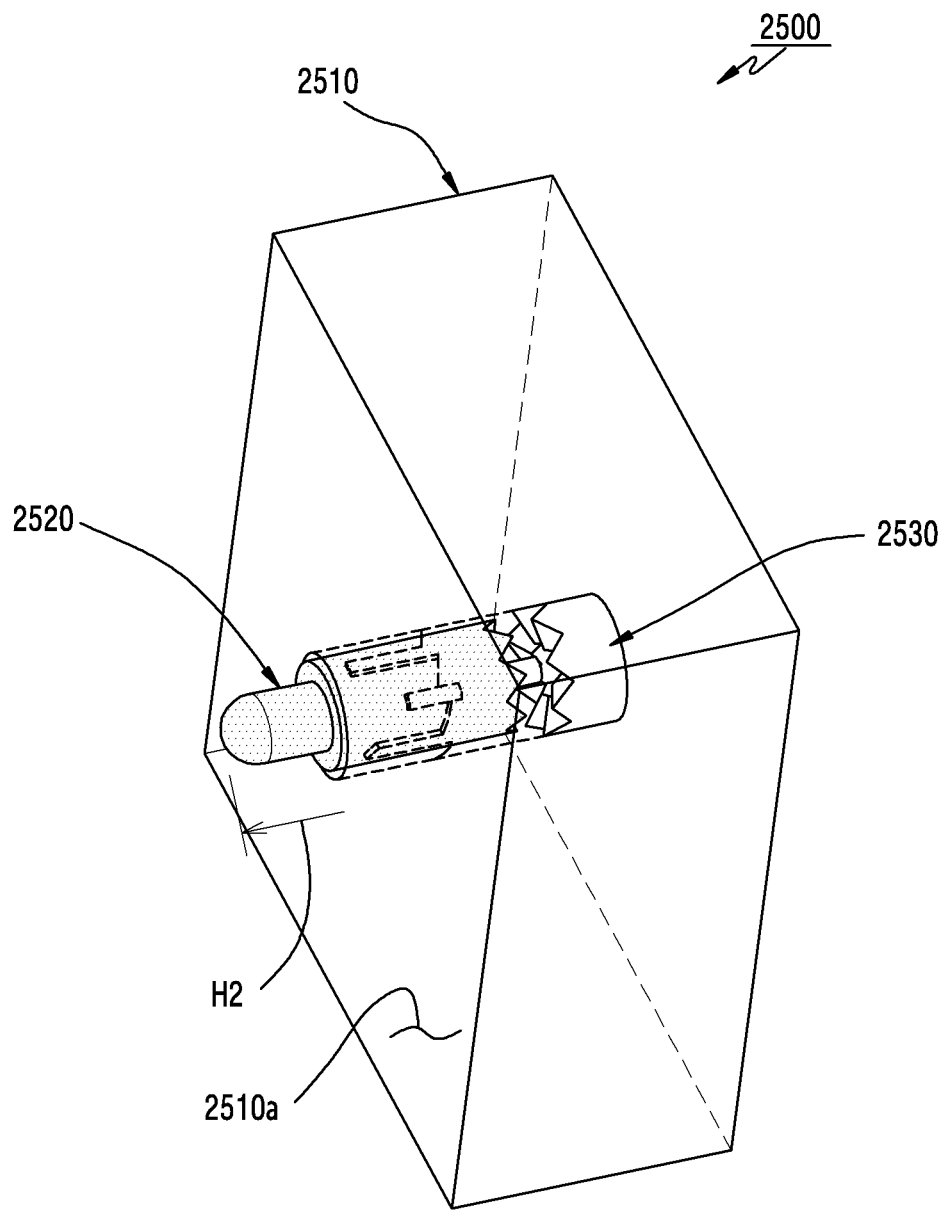

FIG. 25 is an exploded perspective view of a structure including a terminal according to various embodiments. FIGS. 26 and 27 are views illustrating an operation state of the structure of FIG. 25 according to an embodiment.

Referring to FIG. 25, in an embodiment, the structure 2500 may include at least one of a first support member 2510, a terminal 2520, a second support member 2530, or an elastic member 2540.

According to an embodiment, the first support member 2510 is a structure in which the terminal 2520, the second support member 2530, and the elastic member 2540 are disposed, and for example, may include the first housing 301 of the electronic device 300 shown in FIG. 3 or the second housing 401 of the battery charging device 400 shown in FIG. 6. The first support member 2510 may include both side surfaces (for example, a first surface 2510a, a second surface 2510b) disposed on the opposite sides, and may include a hole 2511 penetrating through the first surface 2510a and the second surface 2510b.

According to an embodiment, the terminal 2520 may include a first portion 2521 of a cylindrical shape which is disposed in the hole 2511 of the first support member 2510, and a second portion 2522 which is extended from the first portion 2521. The first portion 2521 may include a third surface 2521a and a fourth surface (not shown) which are disposed on the opposite sides, and a round side surface 2521c enclosing the third surface 2521a and the fourth surface. The second portion 2522 may be extended from the third surface 2521a to protrude with respect to the first surface 2510a of the first support member 2510. When a battery (for example, the battery 800 of FIG. 8A or 8B) is disposed in a device (for example, the electronic device 300 of FIG. 2A or 2B or the battery charging device 400) to which the structure 2500 of FIG. 25 is applied, the second portion 2522 may come into contact with the battery and may be electrically connected with the battery.

According to an embodiment, the second support member 2530 may be disposed to face the fourth surface (not shown) of the first portion 2521 included in the terminal 2520. According to an embodiment, the fourth surface of the first portion 2521 may include a first gear tooth 2524 arranged in a circular shape. According to an embodiment, the second support member 2530 may include a second gear tooth 2531 which is disposed to face the first gear tooth 2524 and to be engaged with the first gear tooth 2524.

According to an embodiment, the terminal 2520 and the second support member 2530 may be disposed with the elastic member 2540 such as a compression spring being disposed therebetween, and the elastic member 2540 may be disposed in the hole 2511 of the first support member 2510. According to an embodiment, the second support member 2530 may be fixed to the hole 2511, and the terminal 2520 may be elastically moved by the elastic member 2540. For example, when a battery (for example, the battery 800 of FIG. 8A or 8B) is disposed in a device to which the structure 2500 of FIG. 25 is applied (for example, the electronic device 300 of FIG. 2A or 2B or the battery charging device 400), the battery may press the second portion 2522 and the terminal 2520 may be elastically moved toward the second support member 2530 by the elastic member 2540. According to various embodiments, the terminal 2520 may include a protrusion 2525 protruding from the fourth surface and penetrating through the compression spring 2540, and the protrusion 2525 may guide compression of the compression spring 2540. According to a certain embodiment, the protrusion 2525 may be omitted.

According to an embodiment, the terminal 2520 may include a protrusion 2523 protruding from the side surface 2521c of the first portion 2521 and extended in a first direction 2501 or a second direction 2502. For example, a plurality of protrusions 2523 may be provided and may be arranged at a corresponding angle with reference to a shaft 2503. According to an embodiment, the first support member 2510 may include recesses 2512, 2513 which are formed on an inner surface of the hole 2511 to have a depth in the second direction 2502. The recesses 2512, 2513 may include a first recess 2512 and a second recess 2513 which have different depths in the second direction 2502, and for example, a plurality of the first recesses 2512 and a plurality of the second recesses 2513 may be iteratively provided.

According to an embodiment, when the terminal 2520 is subjected to an external force in the first direction 2501 toward the second support member 2530, the terminal 2520 may be rotated by a corresponding angle with reference to the shaft 2503 by sliding between an inclined surface of the first gear tooth 2524 and an inclined surface of the second gear tooth 2531. The rotation angle may vary according to a gear ratio of the first gear tooth 2524 and the second gear tooth 2531. According to an embodiment, when the external force is released, the terminal 2520 may be moved in the second direction 2502 opposite to the first direction 2501 by the elastic member 2540. When the terminal 2520 is moved in the second direction 2502, the protrusion 2523 provided on the first portion 2521 may be press-fitted into the first recess 2512 or the second recess 2513 of the first support member 2510. Due to the press-fitting between the protrusion 2523 and the recess 2512, 2513, the terminal 2520 may not be separated from the hole 2511. Every time an external force is applied to the terminal 2520 and is released, the protrusion 2523 of the terminal 2520 may be press-fitted into the first recess 2512 and the second recess 2513, alternately.

In an embodiment, referring to FIGS. 25 and 26, when the protrusion 2523 of the terminal 2520 is press-fitted into the second recess 2513, the terminal 2520 may protrude from the first surface 2510a of the first support member 2510 by a first height H1. In an embodiment, referring to FIGS. 25 and 27, when the protrusion 2523 of the terminal 2520 is press-fitted into the first recess 2512, the terminal 2520 may protrude from the first surface 2510a of the first support member 2510 by a second height H2 lower than the first height H1.

According to various embodiments, the structure 2500 of FIG. 25 may be utilized in replacement of the terminal (at least one first terminal 321, at least one second terminal 322), the compression spring (for example, at least one first compression spring 321a, at least one second compression spring 322a), and the first separation device 350 in the electronic device 300 of FIG. 3. According to various embodiments, the structure 2500 of FIG. 25 may be utilized in replacement of the terminal (at least one third terminal 421, at least one fourth terminal 422), the compression spring (at least one third compression spring 421a, at least one fourth compression spring 422a), and the second separation device 360 in the battery charging device 400 of FIG. 7.

For example, during the operation of the electronic device approaching and retreating the battery charging device to interact to replace a battery, the at least one first terminal disposed in the first slot (for example, the first slot 311 of FIG. 3) of the first battery mounting portion may be in the operation state of FIG. 26, and the at least one third terminal disposed in the third slot (for example, the third slot 411 of FIG. 6) of the second battery mounting portion may be in the operation state of FIG. 27. During the operation of the electronic device approaching and retreating the battery charging device to interact to replace a battery, the at least one second terminal disposed in the second slot (for example, the second slot 312 of FIG. 3) of the first battery mounting portion may be in the operation state of FIG. 27, and the at least one fourth terminal disposed in the fourth slot (for example, the fourth slot 412 of FIG. 6) of the second battery mounting portion may be in the operation state of FIG. 26. In the operation state of FIG. 26, the battery may be separated from the battery mounting portion compared to the operation state of FIG. 27.

According to various embodiments, during the operation of the electronic device approaching and retreating the battery charging device to interact to replace a battery, the at least one first terminal disposed in the first slot (for example, the first slot 311 of FIG. 3) of the first battery mounting portion may be in the operation state of FIG. 27, and the at least one third terminal disposed in the third slot (for example, the third slot 411 of FIG. 6) of the second battery mounting portion may be in the operation state of FIG. 26. During the operation of the electronic device approaching and retreating the battery charging device to interact to replace a battery, the at least one second terminal disposed in the second slot (for example, the second slot 312 of FIG. 3) of the first battery mounting portion may be in the operation state of FIG. 26, and the at least one fourth terminal disposed in the fourth slot (for example, the fourth slot 412 of FIG. 6) of the second battery mounting portion may be in the operation state of FIG. 27.

According to an embodiment, an electronic device (for example, the electronic device 300 of FIG. 3) may include a housing (for example, the first housing 310 of FIG. 3), and a driving unit (for example, the driving unit 302 of FIG. 3) configured to move the housing. The electronic device may include a battery mounting portion (for example, the first battery mounting portion 310 of FIG. 3) formed in the housing to have a battery disposed therein. The first battery mounting portion may include a first slot (for example, the first slot 311 of FIG. 3) to have a first battery (for example, the first battery 501 of FIG. 2A) disposed therein and a second slot (for example, the second slot 312 of FIG. 3) to have a second battery (for example, the second battery 502 of FIG. 2A) disposed therein. The electronic device may include a separation device (for example, the first separation device 350 of FIG. 3) disposed in the battery mounting portion to separate the first battery from the first slot or to separate the second battery from the second slot. The electronic device may include a processor (for example, the processor 1010 of FIG. 1) electrically connected with the driving unit and the separation device, and a memory (for example, the memory 1030 of FIG. 10) operatively connected with the processor. The memory may store instructions that, when being executed, cause the processor to control the separation device to separate the second battery from the second slot when the first battery is disposed in the first slot, and to separate the first battery from the first slot when the second battery is disposed in the second slot.

According to an embodiment of the disclosure, the separation device (for example, the first separation device 350 of FIG. 5) may include: a motor (for example, the motor 353 of FIG. 5), and a lever (for example, the first lever 351 of FIG. 5) connected with the motor and including a first extension portion extended from a portion connected with the motor toward the first slot, and a second extension portion extended toward the second slot. The instructions may cause the processor to control the motor. When the motor is controlled to rotate the lever by a set angle in a first direction, the first battery may be pressed by the first extension portion (for example, the first extension portion 351b of FIG. 5) and may be separated from the first slot. When the motor is controlled to rotate the lever by the set angle in a second direction which is opposite to the first direction, the second battery may be pressed by the second extension portion (for example, the second extension portion 351c of FIG. 5) and may be separated from the second slot.

According to an embodiment, the instructions may cause the processor to control the motor to rotate the lever by the set angle in the first direction when an angle by which the lever is rotated in the first direction reaches a threshold value. The instructions may cause the processor to control the motor to rotate the lever by the set angle in the second direction when an angle by which the lever is rotated in the second direction reaches a threshold value.

According to an embodiment of the disclosure, the electronic device may include a sensor (for example, the sensor 352 of FIG. 5) configured to detect a rotation direction or a rotation angle of the lever (for example, the first lever 351 of FIG. 5), and electrically connected with the processor.

According to an embodiment of the disclosure, the sensor may include an encoder connected with the motor.

According to an embodiment of the disclosure, the instructions may further include an instruction that causes the processor to switch a power source of the electronic device between the first battery and the second battery while all of the first battery and the second battery are electrically connected with the electronic device, before the separation device is driven.

According to an embodiment of the disclosure, the electronic device may include at least one terminal (for example, at least one first terminal 321 of FIG. 3) disposed in the first slot (for example, the first slot 311 of FIG. 3) to be electrically connected with the first battery, and at least one second terminal (for example, at least one second terminal 322 of FIG. 3) disposed in the second slot (for example, the second slot 312 of FIG. 3) to be electrically connected with the second battery. The electronic device may include a power management circuit (for example, the power management circuit 1510 of FIG. 15) including a third terminal (for example, the VIN terminal 1511 of FIG. 15) to receive an external power, and a fourth terminal (for example, the BZT terminal 1512 of FIG. 15) to receive a battery power. The electronic device may include a first switch (for example, the first switch 1521 of FIG. 15) disposed between the at least one first terminal and the third terminal, a second switch (for example, the second switch 1522 of FIG. 15) disposed between the at least one first terminal and the fourth terminal, a third switch (for example, the third switch 1523 of FIG. 15) disposed between the at least one second terminal and the third terminal, and a fourth switch (for example, the fourth switch 1524 of FIG. 5) disposed between the at least one second terminal and the fourth terminal. The instructions may cause the processor to control the first switch, the second switch, the third switch, and the fourth switch to switch a power source of the electronic device between the first battery and the second battery.

According to an embodiment of the disclosure, the instructions may further include an instruction that causes the processor to control the driving unit (for example, the driving unit 1060 of FIG. 1) to move the electronic device to a second electronic device, based on map information stored in the memory included in the electronic device, in order to replace a battery when a remaining capacity of the first battery disposed in the first slot, or a remaining capacity of the second battery disposed in the second slot is less than or equal to a threshold value.

According to an embodiment of the disclosure, the instructions may further include an instruction that causes the processor to control the driving unit to let the electronic device be aligned with the second electronic device and approach the second electronic device, based on data acquired from at least one sensor included in the electronic device.

According to an embodiment of the disclosure, the at least one sensor (for example, the one or more sensors 391, 392 of FIG. 3) may detect light of a set frequency range.

According to an embodiment of the disclosure, an electronic device (for example, the battery charging device 400 of FIG. 6) may include a housing (for example, the second housing 401 of FIG. 6), and a battery mounting portion (for example, the second battery mounting portion 410 of FIG. 6) formed in the housing to have a battery disposed therein. The battery mounting portion may include a first slot (for example, the third slot 411 of FIG. 6) to have a first battery disposed therein and a second slot (for example, the fourth slot 412 of FIG. 6) to have a second battery disposed therein. The electronic device may include a separation device (for example, the second separation device 450 of FIG. 6) disposed in the battery mounting portion to separate the first battery from the first slot or to separate the second battery from the second slot. The electronic device may include a charging circuit (for example, the charging circuit 2350 of FIG. 23) configured to charge the first battery disposed in the first slot or the second battery disposed in the second slot by using an external power source. The electronic device may include a processor (for example, the processor 2310 of FIG. 23) electrically connected with the separation device and the charging circuit; and a memory (for example, the memory 2330 of FIG. 23) operatively connected with the processor. The memory may store instructions that, when being executed, cause the processor to control the separation device to separate the second battery from the second slot when the first battery is disposed in the first slot, and to separate the first battery from the first slot when the second battery is disposed in the second slot.

According to an embodiment of the disclosure, the separation device may include: a motor and a lever (for example, the second lever 451) connected with the motor and including a first extension portion extended from a portion connected with the motor toward the first slot, and a second extension portion extended toward the second slot. The instructions may cause the processor to control the motor. When the motor is controlled to rotate the lever by a set angle in a first direction, the first battery may be pressed by the first extension portion and may be separated from the first slot. When the motor is controlled to rotate the lever by the set angle in a second direction which is opposite to the first direction, the second battery may be pressed by the second extension portion and may be separated from the second slot.

According to an embodiment, the instructions may cause the processor to control the motor to rotate the lever by the set angle in the first direction when an angle by which the lever is rotated in the first direction reaches a threshold value. The instructions may cause the processor to control the motor to rotate the lever by the set angle in the second direction when an angle by which the lever is rotated in the second direction reaches a threshold value.

According to an embodiment of the disclosure, the electronic device may include a sensor configured to detect a rotation direction or a rotation angle of the lever, and electrically connected with the processor.

According to an embodiment of the disclosure, the sensor may include an encoder connected with the motor.

According to an embodiment of the disclosure, an operation method of an electronic device may include: moving to a second electronic device when a remaining capacity of a first battery is less than or equal to a threshold value; when it is detected that a second battery is electrically connected with the electronic device, changing a power source of the electronic device from the first battery to the second battery; and separating the first battery from the electronic device.

According to an embodiment of the disclosure, the method may further include making the electronic device be aligned with the second electronic device and approach the second electronic device.

According to an embodiment of the disclosure, changing the power source of the electronic device from the first battery to the second battery may include changing the power source of the electronic device from the first battery to the second battery while all of the first battery and the second battery are electrically connected with the electronic device.

According to an embodiment of the disclosure, separating the first battery from the electronic device may include separating the first battery from the electronic device by rotating a lever disposed in the electronic device.

According to an embodiment of the disclosure, separating the first battery from the electronic device may include, when an angle by which the lever is rotated reaches a threshold value, separating the first battery from the electronic device by rotating the lever by a set angle.

Embodiments of the disclosure disclosed in the detailed descriptions and the drawings are merely specific examples to easily explain the technical features according to embodiments of the disclosure and to assist in understanding embodiment of the disclosure, and are not included to limit the scope of the embodiments of the disclosure. Accordingly, all changes or modified forms derived based on the technical concept of various embodiments of the disclosure should be interpreted as being included in the scope of the various embodiments of the disclosure.

The invention claimed is:

1. An electronic device comprising:
a housing;
a driving unit configured to move the housing;
a battery mounting portion formed in the housing to have a battery disposed therein, the battery mounting portion comprising a first slot to have a first battery disposed therein and a second slot to have a second battery disposed therein;
a separation device disposed in the battery mounting portion to separate the first battery from the first slot or to separate the second battery from the second slot;
a processor electrically connected with the driving unit and the separation device; and
a memory operatively connected with the processor,
wherein the memory is configured to store instructions that, when being executed, cause the processor to control the separation device to separate the second battery from the second slot when the first battery is disposed in the first slot, and to separate the first battery from the first slot when the second battery is disposed in the second slot, and
wherein the separation device comprises a motor, and a lever connected with the motor, the lever comprising a first extension portion extended from a portion connected with the motor toward the first slot, and a second extension portion extended toward the second slot.

2. The electronic device of claim 1,
wherein the instructions cause the processor to control the motor, wherein, when the motor is controlled to rotate the lever by a set angle in a first direction, the first battery is pressed by the first extension portion and is separated from the first slot, and wherein, when the motor is controlled to rotate the lever by the set angle in a second direction which is opposite to the first direction, the second battery is pressed by the second extension portion and is separated from the second slot.

3. The electronic device of claim 2, wherein the instructions cause the processor to control the motor to rotate the lever by the set angle in the first direction when an angle by which the lever is rotated in the first direction reaches a threshold value, and cause the processor to control the motor to rotate the lever by the set angle in the second direction when an angle by which the lever is rotated in the second direction reaches a threshold value.

4. The electronic device of claim 3, comprising a sensor configured to detect a rotation direction or a rotation angle of the lever, and electrically connected with the processor.

5. The electronic device of claim 4, wherein the sensor comprises an encoder connected with the motor.

6. The electronic device of claim 1, wherein the instructions further comprise an instruction that causes the processor to switch a power source of the electronic device between the first battery and the second battery while all of the first battery and the second battery are electrically connected with the electronic device, before the separation device is driven.

7. The electronic device of claim 6, further comprising:
at least one terminal disposed in the first slot to be electrically connected with the first battery;
at least one second terminal disposed in the second slot to be electrically connected with the second battery;
a power management circuit comprising a third terminal to receive an external power, and a fourth terminal to receive a battery power;
a first switch disposed between the at least one first terminal and the third terminal;
a second switch disposed between the at least one first terminal and the fourth terminal;
a third switch disposed between the at least one second terminal and the third terminal; and
a fourth switch disposed between the at least one second terminal and the fourth terminal,
wherein the instructions cause the processor to control the first switch, the second switch, the third switch, and the fourth switch to switch a power source of the electronic device between the first battery and the second battery.

8. The electronic device of claim 1, wherein the instructions further comprise an instruction that causes the processor to control the driving unit to move the electronic device to a second electronic device, based on map information stored in the memory included in the electronic device, in order to replace a battery when a remaining capacity of the first battery disposed in the first slot, or a remaining capacity of the second battery disposed in the second slot is less than or equal to a threshold value.

9. The electronic device of claim 8, wherein the instructions further comprise an instruction that causes the processor to control the driving unit to let the electronic device be aligned with the second electronic device and approach the second electronic device, based on data acquired from at least one sensor included in the electronic device.

10. The electronic device of claim 9, wherein the at least one sensor is configured to detect light of a set frequency range.

11. An operation method of an electronic device, the method comprising:
moving to a second electronic device including a second battery when a remaining capacity of a first battery disposed on a side of a housing of the electronic device in a first slot opening in a first direction toward which a side of the housing faces is less than or equal to a threshold value;
when it is detected that the second battery is electrically connected with the electronic device, changing a power source of the electronic device from the first battery to the second battery; and
separating the first battery from the electronic device, and
wherein separating the first battery from the electronic device comprises separating the first battery from the first slot in the first direction by rotating a lever disposed on the electronic device in respect to a second direction substantially perpendicular to the first direction.

12. The method of claim 11, further comprising making the electronic device be aligned with the second electronic device and approach the second electronic device.

13. The method of claim 11, wherein changing the power source of the electronic device from the first battery to the second battery comprises changing the power source of the electronic device from the first battery to the second battery while all of the first battery and the second battery are electrically connected with the electronic device.

14. The method of claim 11, wherein separating the first battery from the electronic device comprises, when an angle by which the lever is rotated reaches a threshold value, separating the first battery from the electronic device by rotating the lever by a set angle.

15. An electronic device comprising:
a housing;
a battery mounting portion formed in the housing to have a battery disposed therein, the battery mounting portion including a first slot to have a first battery disposed therein and a second slot to have a second battery disposed therein;
a separation device disposed in the battery mounting portion to separate the first battery from the first slot or to separate the second battery from the second slot;
a charging circuit configured to charge the first battery disposed in the first slot or the second battery disposed in the second slot by using an external power source;
a processor electrically connected with the separation device and the charging circuit; and
a memory operatively connected with the processor,
wherein the memory is configured to store instructions that, when being executed, cause the processor to control the separation device to separate the second battery from the second slot when the first battery is disposed in the first slot, and to separate the first battery from the first slot when the second battery is disposed in the second slot, and
wherein the separation device comprises a motor, and a lever connected with the motor, the lever comprising a first extension portion extended from a portion connected with the motor toward the first slot, and a second extension portion extended toward the second slot.

16. The electronic device of claim 15,
wherein the instructions cause the processor to control the motor, wherein, when the motor is controlled to rotate the lever by a set angle in a first direction, the first battery is pressed by the first extension portion and is separated from the first slot, and wherein, when the motor is controlled to rotate the lever by the set angle in a second direction which is opposite to the first direction, the second battery is pressed by the second extension portion and is separated from the second slot.

17. The electronic device of claim 16, wherein the instructions cause the processor to control the motor to rotate the lever by the set angle in the first direction when an angle by which the lever is rotated in the first direction reaches a threshold value, and cause the processor to control the motor to rotate the lever by the set angle in the second direction when an angle by which the lever is rotated in the second direction reaches a threshold value.

18. The electronic device of claim 17, comprising a sensor configured to detect a rotation direction or a rotation angle of the lever, and electrically connected with the processor.

19. The electronic device of claim 18, wherein the sensor comprises an encoder connected with the motor.

\* \* \* \* \*